US012308506B2

(12) United States Patent
Uemichi et al.

(10) Patent No.: US 12,308,506 B2
(45) Date of Patent: May 20, 2025

(54) SPLITTER-COMBINER AND CASCADE CONNECTION CIRCUIT

(71) Applicants: Fujikura Ltd., Tokyo (JP); International Business Machines Corporation, Armonk, NY (US)

(72) Inventors: Yusuke Uemichi, Sakura (JP); Bodhisatwa Sadhu, Peekskill, NY (US); Jean-Olivier Plouchart, New York, NY (US)

(73) Assignees: Fujikura Ltd., Tokyo (JP); INTERNATIONAL BUSINESS MACHINES CORPORATION, Tokyo (JP)

( * ) Notice: Subject to any disclaimer, the term of this patent is extended or adjusted under 35 U.S.C. 154(b) by 0 days.

(21) Appl. No.: 17/923,344

(22) PCT Filed: Feb. 9, 2022

(86) PCT No.: PCT/US2022/015728
§ 371 (c)(1),
(2) Date: Nov. 4, 2022

(87) PCT Pub. No.: WO2023/154038
PCT Pub. Date: Aug. 17, 2023

(65) Prior Publication Data
US 2024/0222837 A1 Jul. 4, 2024

(51) Int. Cl.
*H01P 5/16* (2006.01)
*H01P 1/213* (2006.01)
*H01P 3/08* (2006.01)

(52) U.S. Cl.
CPC ................ *H01P 5/16* (2013.01); *H01P 1/213* (2013.01); *H01P 3/08* (2013.01)

(58) Field of Classification Search
CPC .... H01P 5/16; H01P 1/213; H01P 3/08; H01P 5/12; H01P 5/19; H01P 1/18; H01P 1/24;
(Continued)

(56) References Cited

U.S. PATENT DOCUMENTS 5,847,625 A * 12/1998 Gillette ..................... H01P 5/16 333/127
6,822,531 B2 * 11/2004 Carlson ..................... H01P 5/04 333/132
(Continued)

FOREIGN PATENT DOCUMENTS

CN 205122743 U 3/2016
CN 107134626 B 6/2019
(Continued)

OTHER PUBLICATIONS

International Search Report dated May 23, 2022, issued in counterpart International Application No. PCT/US22/15728 with ISA237.
(Continued)

*Primary Examiner* — John W Poos
(74) *Attorney, Agent, or Firm* — WHDA, LLP

(57) ABSTRACT

A splitter-combiner includes a first quarter-wave line, a second quarter-wave line, an absorption resistance, a combining terminal, and a line bending circuit. The line bending circuit includes a line parallel region and a line bending region. The line parallel region has the first quarter-wave line and the second quarter-wave line. The first quarter-wave line and the second quarter-wave line are parallel to each other in the line parallel region. The line bending region has the first quarter-wave line and the second quarter-wave line. The first quarter-wave line and the second quarter-wave line are bent in the same direction as each other in the line bending region.

13 Claims, 8 Drawing Sheets

(58) Field of Classification Search
CPC ...... H01P 1/36; H01P 1/38; H01P 5/18; H01P 1/32; H01P 5/184; H03H 7/18; H03H 7/19
See application file for complete search history.

(56) References Cited

U.S. PATENT DOCUMENTS

| | | | | |
|---|---|---|---|---|
| 11,201,381 | B1 * | 12/2021 | Mruk | H01Q 21/0006 |
| 2020/0235456 | A1 | 7/2020 | Yoshioka et al. | |
| 2020/0388900 | A1 * | 12/2020 | Chueh | H01P 5/184 |

FOREIGN PATENT DOCUMENTS

| | | | |
|---|---|---|---|
| EP | 4120471 | A1 | 1/2023 |
| JP | H05-191116 | A | 7/1993 |
| JP | 3209086 | B2 | 9/2001 |
| JP | 2016-5006 | A | 1/2016 |
| JP | 2019-012877 | A | 1/2019 |

OTHER PUBLICATIONS

Grebennikov, Andrei, "42 High Frequency Electronics High Frequency Design Power Combiners, Impedance Transformers and Directional Couplers: Part II", High Frequency Electronics, Jan. 1, 2008, pp. 42-53, XP055974399, cited in EP Extended European Search Report dated Nov. 22, 2023. (7 pages).

Jiang et al., "A miniaturized three way power divider", Antennas, Propagation and EM Theory, 2008, pp. 1033-1035, XP031399248, cited in EP Extended European Search Report dated Nov. 22, 2023. (3 pages).

Dyomin, et al., "Compact microstrip feed networks for low-impedance quadrifillar helix antennas", 2017 Progress in Electromagnetics Research Symposium, May 22, 2017, pp. 3590-3595, XP033302316, cited in EP Extended European Search Report dated Nov. 22, 2023. (6 pages).

* cited by examiner

SPLITTER-COMBINER AND CASCADE CONNECTION CIRCUIT

CROSS-REFERENCE TO RELATED APPLICATION

This application is a National Phase Application filed under 35 U.S.C. § 371 of International Application No. PCT/US2022/015728 filed on Feb. 9, 2022, the contents of which are incorporated herein by reference.

Technical Field

The present disclosure relates to, for example, a splitter-combiner and a cascade connection circuit.

Background

Japanese Patent No. 3209086 discloses a splitter-combiner that combines the power of high-frequency signals such as microwaves, millimeter waves, or the like into one or splits the power into a plurality of powers. The splitter-combiner of Japanese Patent No. 3209086 includes a number of split terminals corresponding to a power of two for one combining terminal ($2^n$: n is an integer greater than or equal to two, which is the number of stages of the splitter-combiner) by providing a plurality of Wilkinson splitter-combiner circuits (hereinafter, simply referred to as splitter-combiner circuits) in a plurality of stages. Each of the splitter-combiner circuits includes two quarter-wave lines in which an electrical length is a quarter wave, an absorption resistor provided between first ends of the two quarter-wave lines forming split terminals, and a combining terminal connecting second ends of the two quarter-wave lines to each other.

In the splitter-combiner of Japanese Patent No. 3209086, the quarter-wave lines are symmetrically disposed with respect to a straight line passing through one combining terminal and a midpoint of two split terminals, and combining terminals of two splitter-combiner circuits of a first stage are connected to two split terminals of one splitter-combiner circuit of a second stage. Similarly, combining terminals of two splitter-combiner circuits of an (S−1)th stage (S is an integer greater than or equal to two and less than or equal to n) are connected to two split terminals of one splitter-combiner circuit of an S-th stage. In such a splitter-combiner, the power of a high-frequency signal flowing in the quarter-wave line of the splitter-combiner circuit increases as the stage becomes higher (as a value of S becomes larger).

SUMMARY

Incidentally, as a frequency of a high-frequency signal handled in the splitter-combiner becomes higher, a distance between split terminals (an electrical length of an absorption resistance) of two quarter-wave lines is preferably smaller in the splitter-combiner circuit. This is because, when a distance between two split terminals becomes large, an amount of phase rotation of a wraparound signal through the absorption resistor does not become 180 degrees, the wraparound signal is not canceled out at a first end of one of the quarter-wave lines, and isolation characteristics between the terminals deteriorate.

However, in the splitter-combiner of Japanese Patent No. 3209086, if a distance between two split terminals (an electrical length of the absorption resistance) of the splitter-combiner circuit of the S-th stage is reduced, a distance between a combining terminal of the splitter-combiner circuit of the (S−1)th stage (S is greater than or equal to two and less than or equal to n) and a split terminal of the splitter-combiner circuit of the S-th stage becomes large, and a connection line connecting the combining terminal of the (S−1)th stage and the split terminal of the S-th stage becomes longer. As a result, in the splitter-combiner, there is a problem that an occupied area (footprint) increases and loss of power transmission increases.

Further, in the above-described splitter-combiner, there is one in which a combined impedance at one combining terminal of an n-th stage (final stage) is larger than split impedances at $2^n$ split terminals of a first stage. Such a splitter-combiner also carries a function of converting impedance between the split impedance and the combined impedance in addition to the function of combining or splitting power.

Here, a characteristic impedance of the quarter-wave line of each splitter-combiner circuit is determined by the split impedance and the combined impedance. When a split impedance is Zin (Ω) and a combined impedance is Zout (Ω), a characteristic impedance Zo (Ω) of the quarter-wave line of each splitter-combiner circuit is represented by the following expression.

$$Zo = (2 \times Zin \times Zout)^{1/2} \quad (1)$$

For example, in order to configure a splitter-combiner that also carries the impedance conversion function described above, it is conceivable to gradually increase a characteristic impedance of the quarter-wave line of the splitter-combiner circuit from the first stage to the n-th stage (a characteristic impedance of the quarter-wave line of the S-th stage is larger than a characteristic impedance of the quarter-wave line of the (S−1)th stage). In this case, a line width of the quarter-wave line of the splitter-combiner circuit gradually decreases from the first stage to the n-th stage (a line width of the quarter-wave line of the S-th stage becomes smaller than a line width of the quarter-wave line of the (S−1)th stage).

Also, the quarter-wave line of the splitter-combiner circuit may be formed of, for example, a side-shielded microstrip line 500 as shown in FIG. 6. The side-shielded microstrip line 500 shown in FIG. 6 includes a signal line 501 and two side ground wirings 502 formed on a first surface 2*a* of a substrate 2 to form a quarter-wave line, and a ground wiring 503 formed on a second surface 2*b* of the substrate 2 (a surface facing an opposite side of the first surface 2*a*). The side ground wirings 502 are disposed on both sides of the signal line 501 at intervals and extend parallel to the signal line 501. The ground wiring 503 is disposed to overlap the signal line 501 in a thickness direction of the substrate 2 and extends along the signal line 501. A line width L of the ground wiring 503 is represented by the following expression (2), in which W is a line width of the signal line 501 and S is a distance between the signal line 501 and each of the side ground wirings 502.

$$L > W + 2 \times S \quad (2)$$

Incidentally, in order to reduce an occupied area (footprint) of the splitter-combiner circuit (particularly the quarter-wave line), for example, it is conceivable to bend two quarter-wave lines (for example, two quarter-wave lines extending parallel to each other are bent in the same direction at a middle portion in a longitudinal direction thereof).

However, when the quarter-wave line is formed of the side-shielded microstrip line 500, since the distance S between the signal line 501 and each side ground wiring 502 becomes larger while the line width W of the quarter-wave line (the signal line 501) becomes smaller as a characteristic impedance of the quarter-wave line becomes larger, the line width L of the ground wiring 503 becomes larger. Therefore, in a splitter-combiner that also carries an impedance conversion function, even if the quarter-wave line of each stage is bent in the same manner, a metal density at the bent portion of the quarter-wave line may exceed a limitation of the metal density in manufacturing in a relatively high stage (for example, from a second stage to an (n−1)th stage).

As described above, in the splitter-combiner, as the stage becomes higher (as a value of S becomes larger), the power of a high-frequency signal flowing in the quarter-wave line of the splitter-combiner circuit becomes larger. Therefore, as described above, if the line width of the quarter-wave line is set to gradually decrease as the stage becomes higher, a large amount of power flows in the quarter-wave line having a small line width as the stage becomes higher. Therefore, there is a problem that reliability decreases in a splitter-combiner of this type due to increase in a proportion of Joule loss of power at a high stage (for example, the n-th stage, the (n−1) stage, or the like) and decrease in power durability in the splitter-combiner circuit (particularly in the quarter-wave line) at a high stage.

One embodiment of the present disclosure provides a splitter-combiner in which miniaturization can be achieved and loss of power transmission can be reduced.

One embodiment of the present disclosure provides a splitter-combiner in which a metal density of a splitter-combiner circuit of a high stage can be reduced to the same level as a metal density of a splitter-combiner circuit in a low stage even when a quarter-wave line of the splitter-combiner circuit in the high stage is bent in the same manner as a quarter-wave line of the splitter-combiner circuit in the low stage.

One embodiment of the present disclosure provides a splitter-combiner in which reliability can be improved by enhancing power durability.

A splitter-combiner according to one aspect of the embodiments includes a first quarter-wave line including a first end and a second end, the first end forming a first split terminal, the second end being located at an opposite side of the first end; a second quarter-wave line including a third end and a fourth end, the second quarter-wave line being away from the first quarter-wave line, the third end forming a second split terminal, the fourth end being located at an opposite side of the third end; an absorption resistance provided between the first end and the third end; a combining terminal formed by connection of the second end and the fourth end; and a line bending circuit including a line parallel region and a line bending region, the line parallel region having the first quarter-wave line and the second quarter-wave line, the first quarter-wave line and the second quarter-wave line being parallel to each other in the line parallel region, the line bending region having the first quarter-wave line and the second quarter-wave line, the first quarter-wave line and the second quarter-wave line being bent in the same direction as each other in the line bending region.

In the splitter-combiner according to one aspect of the embodiments, the first quarter-wave line may include a bent portion, a part of the first quarter-wave line may be bent at the bent portion, and the bent portion may include a portion not parallel to the second quarter-wave line.

In the splitter-combiner according to one aspect of the embodiments, the first quarter-wave line may include a first bent portion located between the first end and the second end, the first quarter-wave line may be bent at 180 degrees at the first bent portion, a wave-line direction from the first end to the first bent portion and a wave-line direction from the first bent portion to the second end may be opposite to each other, the second quarter-wave line may include a second bent portion located between the third end and the fourth end, the second quarter-wave line may be bent at 180 degrees at the second bent portion, and a wave-line direction from the third end to the second bent portion and a wave-line direction from the second bent portion to the fourth end may be opposite to each other.

The splitter-combiner according to one aspect of the embodiments may further include: a first circuit block including a first connection terminal connected to the first end of the first quarter-wave line; and a second circuit block including a second connection terminal connected to the third end of the second quarter-wave line, wherein the first circuit block and the second circuit block may be aligned in an array direction in which the first end and the third end are aligned, and the first connection terminal and the second connection terminal may face each other in the array direction of the first end and the third end.

The splitter-combiner according to one aspect of the embodiments may further include: a splitter-combiner circuit part including S circuit stages (S is an integer greater than or equal to two and less than or equal to n) and ($2^n$-1) splitter-combiner circuits (n is an integer greater than or equal to two), the ($2^n$−1) splitter-combiner circuits being connected stepwise in the S circuit stages; and $2^n$ circuit blocks, wherein each of the ($2^n$-1) splitter-combiner circuits may include the first split terminal, the second split terminal, the first quarter-wave line, the second quarter-wave line, the absorption resistance, and the combining terminal, a first circuit stage may include $2^n$ split terminals in total including the first split terminal and the second split terminal and may include $2^n/2$ splitter-combiner circuits, each of the first split terminal and the second split terminal of one splitter-combiner circuit forming S-th circuit stage may be connected to the combining terminal of one splitter-combiner circuit forming (S−1)th circuit stage, at least one of the ($2^n$-1) splitter-combiner circuits may be the line bending circuit, the $2^n$ circuit blocks may be connected to the $2^n$ split terminals of the first circuit stage in one-to-one correspondence, the $2^n$ circuit blocks may form a first circuit block group and a second circuit block group, $S^n/2$ circuit blocks may be aligned in line in a first direction in the first circuit block group, $S^n/2$ circuit blocks may be aligned in line in the first direction in the second circuit block group, the first circuit block group may be spaced apart from the second circuit block group at a distance in a second direction orthogonal to the first direction, and the splitter-combiner circuit part may be disposed between the first circuit block group and the second circuit block group.

The splitter-combiner according to one aspect of the embodiments may further include: a splitter-combiner circuit part including S circuit stages (S is an integer greater than or equal to two and less than or equal to n) and ($2^n$−1) splitter-combiner circuits (n is an integer greater than or equal to two), the ($2^n$−1) splitter-combiner circuits being connected stepwise in the S circuit stages, wherein each of the ($2^n$−1) splitter-combiner circuits may include the first split terminal, the second split terminal, the first quarter-wave line, the second quarter-wave line, the absorption resistance, and the combining terminal, a first circuit stage may include $2^n$ split terminals in total including the first split terminal and the second split terminal and may include $2^n/2$ splitter-combiner circuits, each of the first split terminal and the second split terminal of one splitter-combiner circuit forming S-th circuit stage may be connected to the combining terminal of one splitter-combiner circuit forming (S−1)th circuit stage, the splitter-combiner circuit constituting at least the first circuit stage may be the line bending circuit, and the first quarter-wave line and the second quarter-wave line of the splitter-combiner circuit which constitute at least one circuit stage selected from a plurality of stages from a second circuit stage to an (n−1)th circuit stage may extend on opposite sides to each other from the first split terminal and the second split terminal to form a loop shape.

The splitter-combiner according to one aspect of the embodiments may further include: a splitter-combiner circuit part including S circuit stages (S is an integer greater than or equal to two and less than or equal to n) and ($2^n$−1) splitter-combiner circuits (n is an integer greater than or equal to two), the ($2^n$−1) splitter-combiner circuits being connected stepwise in the S circuit stages, wherein each of the ($2^n$−1) splitter-combiner circuits may include the first split terminal, the second split terminal, the first quarter-wave line, the second quarter-wave line, the absorption resistance, and the combining terminal, a first circuit stage may include $2^n$ split terminals in total including the first split terminal and the second split terminal and may include $2^n/2$ splitter-combiner circuits, each of the first split terminal and the second split terminal of one splitter-combiner circuit forming S-th circuit stage may be connected to the combining terminal of one splitter-combiner circuit forming (S−1)th circuit stage, at least one of the ($2^n$−1) splitter-combiner circuits may be the line bending circuit, and a length of a connection line connecting the first split terminal and the combining terminal may be different from a length of a connection line connecting the second split terminal and the combining terminal in connection between each of the first split terminal and the second split terminal of one splitter-combiner circuit constituting the S-th circuit stage and the combining terminal of one splitter-combiner circuit constituting the (S−1)th circuit stage.

A cascade connection circuit according to one aspect of the embodiments includes: ($2^n$−1) splitter-combiner circuits, each splitter-combiner circuit forming the above described splitter-combiner; and n circuit stages (n is an integer greater than or equal to two) in which the ($2^n$−1) splitter-combiner circuits are connected stepwise, wherein a combined impedance at the combining terminal of the splitter-combiner circuit constituting an n-th circuit stage may be higher than a split impedance at the split terminal of the splitter-combiner circuit constituting a first circuit stage.

In the cascade connection circuit according to one aspect of the embodiments, in S circuit stages (S is an integer greater than or equal to two and less than or equal to n) included in the n circuit stages, a first circuit stage may include $2^n$ split terminals in total including the first split terminals and the second split terminals and may be constituted by $S^n/2$ splitter-combiner circuits, the first split terminal and the second split terminal of the splitter-combiner circuit constituting an S-th circuit stage may be connected to the combining terminals of two splitter-combiner circuits constituting an (S−1)th circuit stage, a combined impedance at the combining terminal of the splitter-combiner circuit constituting the n-th circuit stage may be higher than a split impedance at the split terminal of the splitter-combiner circuit constituting the first circuit stage, the first quarter-wave line and the second quarter-wave line may be each formed of a microstrip line with a side shield, and in the splitter-combiner circuit constituting at least one set of two continuous circuit stages, a line width of the first quarter-wave line of the splitter-combiner circuit constituting one of the stages and a line width of the first quarter-wave line of the splitter-combiner circuit constituting the other of the stages may be equal to each other, and a line width of the second quarter-wave line of the splitter-combiner circuit constituting one of the stages and a line width of the second quarter-wave line of the splitter-combiner circuit constituting the other of the stages may be equal to each other.

In the cascade connection circuit according to one aspect of the embodiments, in S circuit stages (S is an integer greater than or equal to two and less than or equal to n) and i circuit stages (i is an integer greater than or equal to two and less than or equal to (n−1)) included in the n circuit stages, a first circuit stage may include $2^n$ split terminals in total including the first split terminals and the second split terminals and may be constituted by $S^n/2$ splitter-combiner circuits, the first split terminal and the second split terminal of the splitter-combiner circuit constituting an S-th circuit stage may be connected to the combining terminals of two splitter-combiner circuits constituting an (S−1)th circuit stage, line widths of a plurality of first quarter-wave lines of a plurality of splitter-combiner circuits constituting circuit stages from an i-th stage to the n-th stage may be equal to each other, line widths of a plurality of second quarter-wave lines of the plurality of splitter-combiner circuits constituting circuit stages from the i-th stage to the n-th stage may be equal to each other, the first quarter-wave line and the second quarter-wave line of each of the plurality of splitter-combiner circuits constituting circuit stages from the i-th stage to the n-th stage may have a first line width, a maximum line width among a plurality of line widths of the first quarter-wave line and the second quarter-wave line of the splitter-combiner circuit in the plurality of splitter-combiner circuits constituting circuit stages from the first stage to an (i−1)th stage may be a second line width, and the first line width may be larger than the second line width.

In the cascade connection circuit according to one aspect of the embodiments, in S circuit stages (S is an integer greater than or equal to two and less than or equal to n) included in the n circuit stages, a first circuit stage may include $2^n$ split terminals in total including the first split terminals and the second split terminals and may be constituted by $S^n/2$ splitter-combiner circuits, the first split terminal and the second split terminal of the splitter-combiner circuit constituting an S-th circuit stage may be connected to the combining terminals of two splitter-combiner circuits constituting an (S−1)th circuit stage, and, in two or more circuit stages selected from a plurality of stages from the first circuit stage to the n-th circuit stage and aligned to be continuous, a line width of the first quarter-wave line and a line width of the second quarter-wave line of the splitter-combiner circuit constituting the circuit stage may increase sequentially as the number of stages of the circuit stages increases.

In the cascade connection circuit according to one aspect of the embodiments, in S circuit stages (S is an integer greater than or equal to two and less than or equal to n) and j circuit stages (j is an integer greater than or equal to two and less than or equal to n) included in the n circuit stages, a first circuit stage may include $2^n$ split terminals in total including the first split terminals and the second split terminals and may be constituted by $S^n/2$ splitter-combiner circuits, the first split terminal and the second split terminal of the splitter-combiner circuit constituting an S-th circuit stage may be connected to the combining terminals of two splitter-combiner circuits constituting an (S−1)th circuit stage, the first quarter-wave line and the second quarter-wave line may be each formed of a microstrip line, and split impedances at the first split terminal and the second split terminal of at least one splitter-combiner circuit constituting a j-th circuit stage may be higher than split impedances at the first split terminal and the second split terminal of the first-stage and a combined impedance at the combining terminal of the splitter-combiner circuit of an n-th stage.

A splitter-combiner according to one aspect of the embodiments includes: a first quarter-wave line including a first end and a second end, the first end forming a first split terminal, the second end being located at an opposite side of the first end; a second quarter-wave line including a third end and a fourth end, the second quarter-wave line being away from the first quarter-wave line, the third end forming a second split terminal, the fourth end being located at an opposite side of the third end; an absorption resistance provided between the first end and the third end; and a combining terminal formed by connection of the second end and the fourth end; wherein the first quarter-wave line includes a first bent portion located between the first end and the second end, the first quarter-wave line is bent at 180 degrees at the first bent portion, a wave-line direction from the first end to the first bent portion and a wave-line direction from the first bent portion to the second end are opposite to each other, the second quarter-wave line includes a second bent portion located between the third end and the fourth end, the second quarter-wave line is bent at 180 degrees at the second bent portion, and a wave-line direction from the third end to the second bent portion and a wave-line direction from the second bent portion to the fourth end are opposite to each other.

According to one aspect of the embodiments, for example, miniaturization can be achieved and loss of power transmission can be reduced in the splitter-combiner.

According to one aspect of the embodiments, for example, in the splitter-combiner, a metal density of the splitter-combiner circuit of a high stage is reduced to the same level as a metal density of the splitter-combiner circuit in a low stage even when a quarter-wave line of the splitter-combiner circuit in the high stage is bent in the same manner as a quarter-wave line of the splitter-combiner circuit in the low stage.

According to one aspect of the embodiments, for example, power durability of the splitter-combiner can be enhanced and reliability can be improved.

BRIEF DESCRIPTION OF DRAWINGS

The advantages of the disclosure will become apparent in the following description taken in conjunction with the following drawings.

DESCRIPTION OF EMBODIMENTS

First Embodiment

Hereinafter, a splitter-combiner according to a first embodiment will be described with reference to the drawings.

Figure 1:
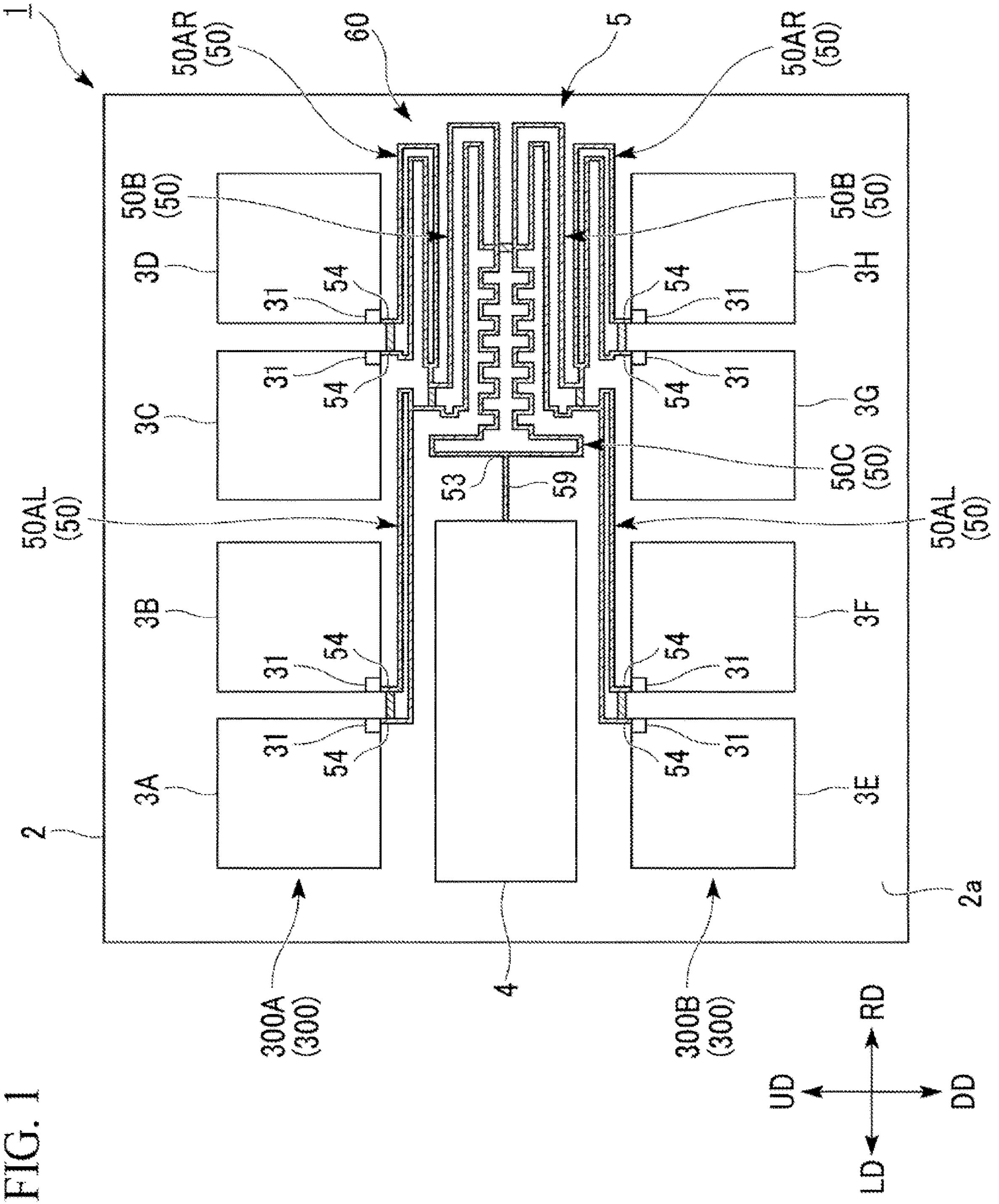
FIG. 1 is a plan view showing a splitter-combiner according to a first embodiment.
Figure 2:
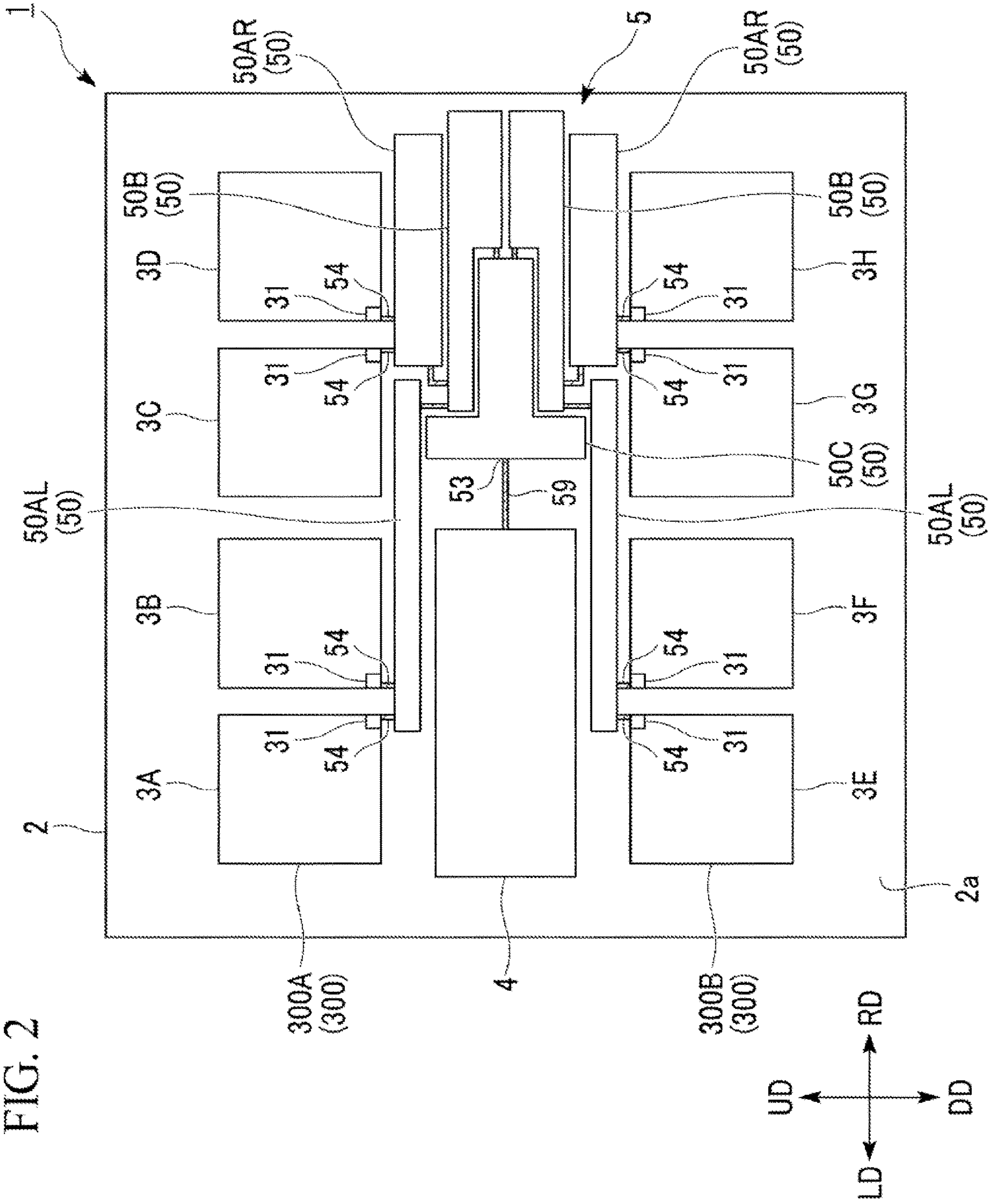
FIG. 2 is a view schematically showing the splitter-combiner of FIG. 1.

As shown in FIGS. 1 and 2, a splitter-combiner 1 includes a plurality of split circuit blocks 3A to 3H (circuit blocks) provided on a substrate 2, one combining circuit block 4, and a splitter-combiner circuit part 5 connecting the plurality of split circuit blocks 3A to 3H to the combining circuit block 4.

Each of the split circuit blocks 3 outputs (or transmits) high-frequency signals such as microwaves, millimeter waves, or the like or has a high-frequency signal input thereto (receives) from the outside. The number of the split circuit blocks 3 is $2^n$ (n is an integer greater than or equal to two).

The plurality of split circuit blocks 3 each include a connection terminal 31 connected to a quarter-wave line 51. The connection terminal 31 corresponds to a first connection terminal 31F or a second connection terminal 31S to be described later.

In the splitter-combiner 1, powers of a high-frequency signal input to the splitter-combiner circuit part 5 from $2^n$ split circuit blocks 3 can be combined into one in the splitter-combiner circuit part 5 and then can be output to the combining circuit block 4. Also, in the splitter-combiner 1, the power of a high-frequency signal input from the combining circuit block 4 to the splitter-combiner circuit part 5 can be split into $2^n$ in the splitter-combiner circuit part 5 and then can be output to the $2^n$ split circuit blocks 3.

The splitter-combiner circuit part 5 includes ($2^n$−1) splitter-combiner circuits 50 for the $2^n$ split circuit blocks 3. Specifically, the splitter-combiner circuit part 5 includes S circuit stages 60 (S is an integer greater than or equal to two and less than or equal to n) in which the ($2^n$−1) splitter-combiner circuits 50 are connected stepwise. In the structure of the shown example, n is 3. Therefore, the number of the split circuit blocks 3 is eight, the number of the splitter-combiner circuits 50 is seven, and the number of stages of the circuit stages 60 is three.

Further, in the present embodiment, a case in which n is 3 will be described, but n may be 2 or may be 4 or more.

In the following description, the circuit stages 60 having three stages may be referred to as "first circuit stage 60," "second circuit stage 60," and "third circuit stage 60," or may be simply referred to as "first stage," "second stage," and "third stage".

An S-th circuit stage 60 may be simply referred to as "S-th stage".

An (S−1)th circuit stage 60 may be simply referred to as "(S−1)th stage".

An n-th circuit stage 60 may be simply referred to as "n-th stage".

An (n−1)th circuit stage 60 may be simply referred to as "(n−1)th stage".

An i-th circuit stage 60 may be simply referred to as "i-th stage".

An (i−1)th circuit stage 60 may be simply referred to as "(i−1)th stage".

A j-th circuit stage 60 may be simply referred to as "j-th stage".

Also, the split circuit blocks 3A to 3H may be simply referred to as a split circuit block 3 or a circuit block 3.

Also, the combining circuit block 4 may be simply referred to as a circuit block 4.

Figure 3:
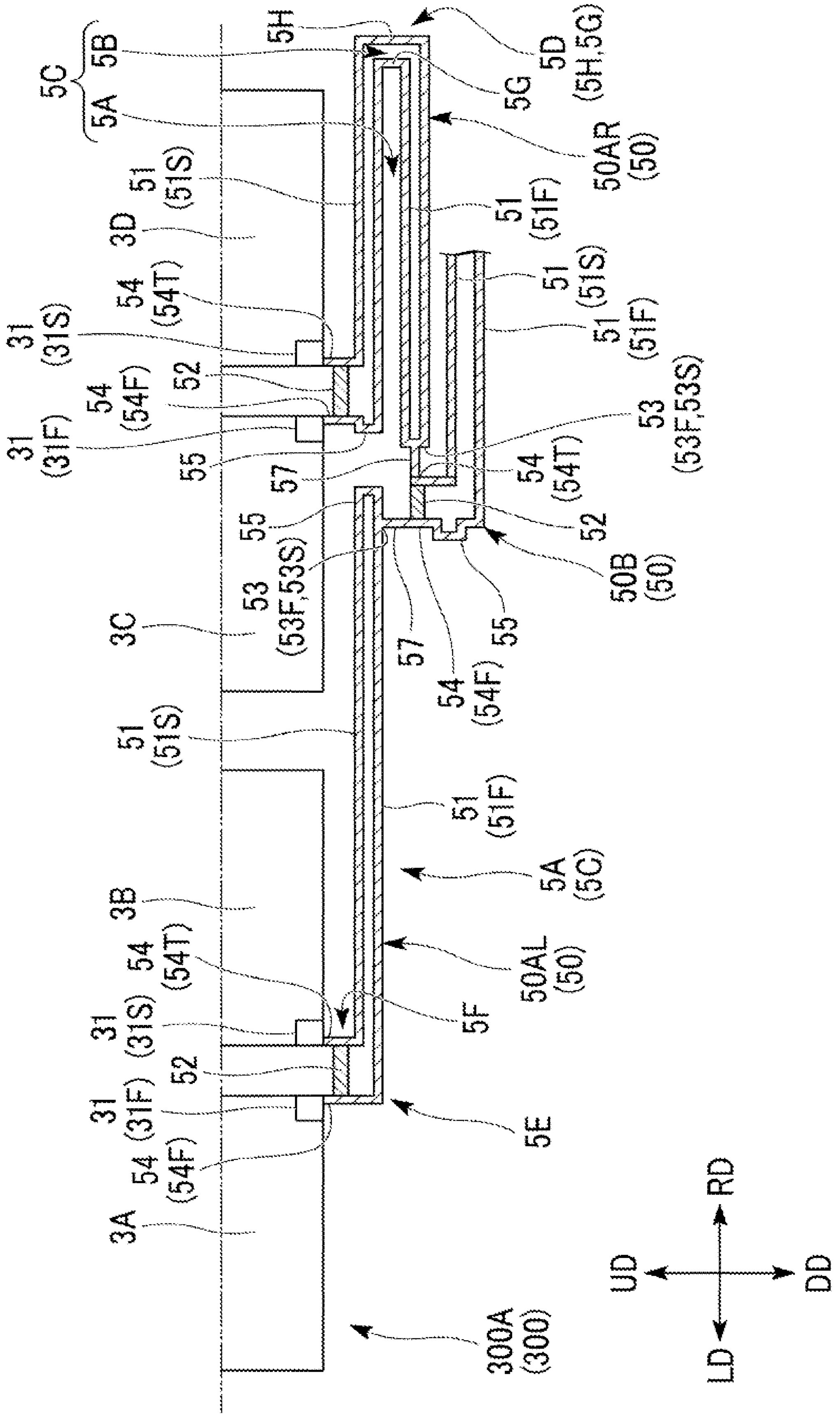
FIG. 3 is an enlarged view showing two first-stage splitter-combiner circuits connected to one second-stage splitter-combiner circuit in the splitter-combiner of FIG. 1
Figure 4:
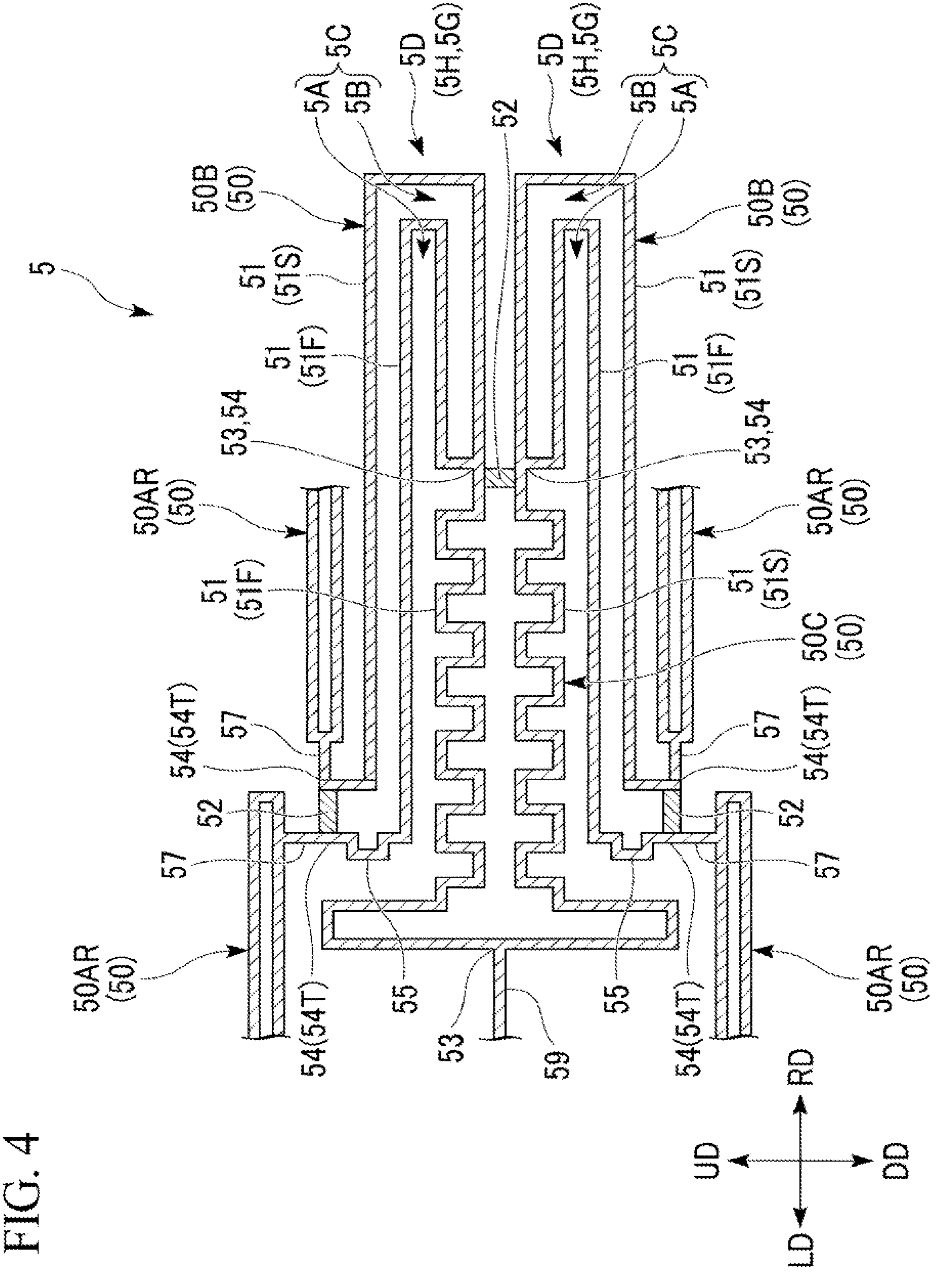
FIG. 4 is an enlarged view showing second-stage and third-stage splitter-combiner circuits in the splitter-combiner of FIG. 1.

As shown in FIGS. 3 and 4, the seven splitter-combiner circuits 50 each include two quarter-wave lines 51, one absorption resistance 52, and one combining terminal 53.

One of the two quarter-wave lines 51 is a first quarter-wave line 51F. The other of the two quarter-wave lines 51 is a second quarter-wave line 51S.

The first quarter-wave line 51F includes a first end 54F forming a first split terminal 54 and a second end 53S located on an opposite side of the first end 54F. In other words, the first end 54F of the first quarter-wave line 51F in a length direction is the first split terminal 54.

The second quarter-wave line 51S includes a third end 54T forming a second split terminal 54 and a fourth end 53F located on an opposite side of the third end 54T. The second quarter-wave line 51S is spaced apart from the first quarter-wave line 51F. In other words, the third end 54T of the second quarter-wave line 51S in a length direction is the second split terminal 54.

In the following description, the first quarter-wave line 51F and the second quarter-wave line 51S may each be simply referred to as the quarter-wave line 51.

Also, the first split terminal 54 and the second split terminal 54 may each be simply referred to as a split terminal 54.

The quarter-wave line 51 is made of a conductor formed on, for example, a first surface 2*a* of the substrate 2 (see FIGS. 1 and 2) and extends linearly. Lengths of the two quarter-wave lines 51 are equal to each other. The absorption resistance 52 is provided between the first end 54F (the split terminal 54) of the first quarter-wave line 51F and the third end 54T (the split terminal 54) of the second quarter-wave line 51S.

The combining terminal 53 is formed by connection of the second end 53S of the first quarter-wave line 51F and the fourth end 53F of the second quarter-wave line 51S.

As shown in FIGS. 1 and 2, the first circuit stage 60 includes $2^n$ split terminals in total including the first split terminals 54 and the second split terminals 54 and is constituted by $2^n/2$ splitter-combiner circuits. That is, since n=3 in the present embodiment, the first circuit stage 60 includes eight split terminals in total and four splitter-combiner circuits 50 (50AL and SOAR). That is, four of the seven splitter-combiner circuits 50 are first-stage splitter-combiner circuits 50AL and SOAR. The four first-stage splitter-combiner circuits 50AL and 50AR have a total of eight split terminals 54. These eight split terminals 54 are respectively connected to eight split circuit blocks 3.

Another two of the seven splitter-combiner circuits 50 are an (S−1)th circuit stage 60, that is, a second-stage splitter-combiner circuit 50B. As shown in FIG. 3, the second-stage splitter-combiner circuit 501B includes the first quarter-wave line 51F having the first end 54F and the second quarter-wave line 51S having the third end 54T. The first end 54F is the first split terminal 54, and the third end 54T is the second split terminal 54. One (the first split terminal) of the two split terminals 54 of the splitter-combiner circuit 50B is connected to the combining terminal 53 of the first-stage splitter-combiner circuit 50AL. The other (the second split terminal) of the two split terminals 54 of the splitter-combiner circuit 50B is connected to the combining terminal 53 of the first-stage splitter-combiner circuit 50AR.

The splitter-combiner 1 includes the circuit block 3 (a first circuit block) having the first connection terminal 31F connected to the first end 54F of the first quarter-wave line 51F, and the circuit block 3 (a second circuit block) having the second connection terminal 31S connected to the third end 54T of the second quarter-wave line 51S.

In the example shown in FIG. 1, the circuit blocks 3A, 3C, 3E, and 3G correspond to the first circuit block. The circuit blocks 3B, 3D, 3F, and 3H correspond to the second circuit block.

Referring to FIG. 3, the circuit block 3A corresponding to the first circuit block and the circuit block 3B corresponding to the second circuit block are aligned in a disposition direction in which the first end 54F and the third end 54T are disposed. In the circuit blocks 3A and 3B, the first connection terminal 31F and the second connection terminal 31S face each other in a disposition direction of the first end 54F and the third end 54T. That is, the first connection terminal 31F and the second connection terminal 31S are located at portions facing each other (that is, close to each other) in the above-described disposition direction.

Similarly, the circuit blocks 3C, 3E, and 3G which are the first circuit blocks and the circuit blocks 3D, 3F, and 3H which are the second circuit blocks also employ the configuration described above.

As shown in FIGS. 1 and 2, the S-th circuit stage 60, that is, one splitter-combiner circuit constituting the third stage, that is, remaining one of the seven splitter-combiner circuits 50 is a third-stage splitter-combiner circuit 50C. As shown in FIG. 4, two split terminals 54 (the first split terminal and the second split terminal) of the third-stage splitter-combiner circuit 50C are each connected to the combining terminal 53 of one splitter-combiner circuit 50B constituting the second circuit stage 60.

In other words, the first split terminal of the splitter-combiner circuit 50C is connected to the combining terminal 53 of one of the two second-stage splitter-combiner circuits 50B. The second split terminal of the splitter-combiner circuit 50C is connected to the combining terminal 53 of the other of the two second-stage splitter-combiner circuits 50B. Also, as shown in FIGS. 1 and 2, a combining terminal 53 of the third-stage splitter-combiner circuit 50C is connected to the combining circuit block 4.

The splitter-combiner circuit part 5 of the shown example is configured to combine or split the power of a high-frequency signal in three stages. Note that, the number of stages in which the power of a high-frequency signal is combined or split in the splitter-combiner circuit part 5 is appropriately changed according to the number ($2^n$) of the split circuit blocks 3. When the number of the split circuit blocks 3 is $2^n$, the number of stages for combining and splitting the power of a high-frequency signal is n (n is an integer).

As shown in FIGS. 1 and 2, in the first embodiment, four ($2^n/2$) split circuit blocks 3 are aligned in a line in a first direction (hereinafter, also referred to as a left-right direction) to configure one circuit block group 300 (first circuit block group and second circuit block group). Then, a first circuit block group 300A and a second circuit block group 300B, which are two circuit block groups 300, are disposed at a distance in a second direction (hereinafter, also referred to as a vertical direction) perpendicular to the first direction. The splitter-combiner circuit part 5 is disposed between these two circuit block groups 300.

In the following description, one of the two circuit block groups 300 may be referred to as an upper circuit block group 300A, and the other thereof may be referred to as a lower circuit block group 300B. Also, a direction from the upper circuit block group 300A toward the lower circuit block group 300B may be referred to as a downward direction, and a direction opposite thereto may be referred to as an upward direction.

In FIGS. 1 to 5, an upward direction UD, a downward direction DD, a leftward direction LD, and a rightward direction RID are shown. That is, a vertical direction corresponds to the upward direction UD and the downward direction DD. A left-right direction corresponds to the leftward direction LD and the rightward direction RD.

As shown in FIGS. 1 and 3, in the first stage, the splitter-combiner circuits 50AL and 50AR have the same configuration. The two split circuit blocks 3A and 3B connected to the two split terminals 54 of the splitter-combiner circuit 50AL are aligned in a disposition direction (hereinafter, also referred to as a left-right direction) of the two split terminals 54.

Similarly, the two split circuit blocks 3C and 3D connected to the two split terminals 54 of the splitter-combiner circuit 50AR are disposed in a disposition direction (hereinafter, also referred to as a left-right direction) of the two split terminals 54.

The eight circuit blocks are connected to correspond to $2^n$ split terminals 54 in the first circuit stage 60.

Specifically, the first end 54F, which is one terminal of the two split terminals 54 of the splitter-combiner circuit 50AL, is connected to the first connection terminal 31F of the split circuit block 3A, and the third end 54T, which is the other terminal thereof, is connected to the second connection terminal 31S of the split circuit block 3B. In a direction (left-right direction) in which the split circuit blocks 3A and 3B are disposed, a portion of the first connection terminal 31F of the split circuit block 3A faces a portion of the second connection terminal 31S of the split circuit block 3B.

Thereby, even if the two split terminals 54 of the splitter-combiner circuit 50AL are directly connected to the connection terminals 31 of the split circuit blocks 3A and 3B, a distance between the two split terminals 54 (an electrical length of the absorption resistance 52) can be reduced.

Similarly, the first end 54F, which is one terminal of the two split terminals 54 of the splitter-combiner circuit 50AR, is connected to the first connection terminal 31F of the split circuit block 3C, and the third end 54T, which is the other terminal thereof, is connected to the second connection terminal 31S of the split circuit block 3D. In a direction (left-right direction) in which the split circuit blocks 3C and 3D are disposed, a portion of the first connection terminal 31F of the split circuit block 3C faces a portion of the second connection terminal 31S of the split circuit block 3D.

Thereby, even if the two split terminals 54 of the splitter-combiner circuit 50AR are directly connected to the connection terminals 31 of the split circuit blocks 3C and 3D, a distance between the two split terminals 54 (an electrical length of the absorption resistance 52) can be reduced.

At least one of the seven splitter-combiner circuits 50 constituting the splitter-combiner circuit part 5 includes a line bending circuit 5C. The line bending circuit 5C includes a line parallel region 5A and a line bending region 5B. In the line parallel region 5A, the first quarter-wave line 5I F and the second quarter-wave line 51S extend parallel to each other. In the line bending region 5B, the first quarter-wave line 51F and the second quarter-wave line 51S are bent in the same direction.

Particularly, in the line parallel region 5A, in both the first-stage splitter-combiner circuits 50AL and 50AR, the two quarter-wave lines 51, extend parallel to each other. In the line bending region 5B, the two quarter-wave lines 51 are bent in the same direction at a middle portion 5D in a longitudinal direction.

For example, as shown in FIG. 3, the two quarter-wave lines 51 of each of the two first-stage splitter-combiner circuits 50AL and 50AR connected to the split circuit blocks 3A to 3D in the upper circuit block group 300A extend downward from the upper circuit block group 300A, in which the first quarter-wave line 51F is bent at a right angle at a portion SE and extends to one side in the left-right direction, and the second quarter-wave line SIS is bent at a right angle at a portion SF and extends to one side in the left-right direction.

The quarter-wave lines 51 of the two first-stage splitter-combiner circuits 50AL and 50AR aligned in the left-right direction extend to approach each other in the left-right direction. Thereby, even if the split terminals 54 of the two first-stage splitter-combiner circuits 50AL and 50AR aligned in the left-right direction are located apart from each other in the left-right direction, the combining terminals 53 of the two first-stage splitter-combiner circuits 50AL and 50AR can be located to be close to each other.

In FIG. 3, the quarter-wave lines 51 of the left splitter-combiner circuit 50AL located on a left side extend only in the rightward direction, and the combining terminal 53 of the left splitter-combiner circuit 50AL is located close to the split terminals 54 of the right splitter-combiner circuit 50AR located on a right side. Therefore, the quarter-wave lines 51 of the right splitter-combiner circuit 50AR extend in the rightward direction (a predetermined direction) from the split terminals 54, then are folded back by 180 degrees at the middle portion 5D, and extend in the leftward direction (a direction approaching the combining terminals 53 of the left splitter-combiner circuit 50AL, that is, a direction opposite to the predetermined direction). Thereby, lengths of the quarter-wave lines 51 of the right splitter-combiner circuit 50AR are secured.

That is, the first quarter-wave line 51F has a first bent portion 5G. The first bent portion 5G is located between the first end 54F and the second end 53S and bent so that the first quarter-wave line 51F is folded back by 180 degrees. Here, a wave-line direction from the first end 54F toward the first bent portion 5G and a wave-line direction from the first bent portion 5G toward the second end 53S are opposite to each other.

Also, the second quarter-wave line 51S has a second bent portion 5H. The second bent portion 5H is located between the third end 54T and the fourth end 53F and bent so that the second quarter-wave line 51S is folded back by 180 degrees. Here, a wave-line direction from the third end 54T toward the second bent portion 5H and a wave-line direction from the second bent portion 5H to the fourth end 53F are opposite to each other.

When a layout of the quarter-wave lines 51 of the left splitter-combiner circuit 50AL and the right splitter-combiner circuit 50AR is configured in this way, intervals between the four split circuit blocks 3 aligned in the left-right direction can be reduced while securing lengths of the quarter-wave lines 51 of each of the splitter-combiner circuits 50.

Although not shown in FIG. 3, a layout of the two quarter-wave lines 51 of the two first-stage splitter-combiner circuits 50AL and 50AR connected to the split circuit blocks 3 in the lower circuit block group 300B (see FIG. 1) has a structure in which the structure shown in FIG. 3 is vertically turned over. That is, the upper circuit block group 300A and the lower circuit block group 300B have a line-symmetrical relationship with respect to a connection line 59 to be described later.

As shown in FIG. 3, a first end 54F and a third end 54T corresponding to two split terminals 54 (a first split terminal and a second split terminal) of one second-stage splitter-combiner circuit 50B are connected to the combining terminals 53 of the two first-stage splitter-combiner circuits 50AL and 50AR aligned on the left and right sides. In FIG. 3, the split terminals 54 of the second stage (S-th stage) and the combining terminals 53 of the first stage ((S−1)th stage) are connected via connection lines 57. The split terminals 54 of the second stage and the combining terminals 53 of the first stage may be connected, for example, directly. Also, in FIG. 3, a length of the connection line 57 connecting the first split terminal 54 of one second-stage splitter-combiner circuit 50B and the combining terminal 53 of the first-stage splitter-combiner circuit 50AL is different from a length of the connection line 57 connecting the second split terminal 54 of one second-stage splitter-combiner circuit 50B and the combining terminal 53 of the first-stage splitter-combiner circuit 50AR.

As shown in FIG. 4, the second-stage splitter-combiner circuit 50B has two quarter-wave lines 51 extending parallel to each other similarly to those of the first-stage splitter-combiner circuits 50AL and 50AR. The splitter-combiner circuit 50B includes a line bending circuit 5C having a line bending region 5B in which two quarter-wave lines 51 are bent in the same direction at a middle portion 5D in a longitudinal direction. The second-stage splitter-combiner circuit 50B has the same configuration as the right splitter-combiner circuit 50AR of the first stage (see FIG. 3). That is, the quarter-wave lines 51 of the splitter-combiner circuit 50B extend in a rightward direction (a predetermined direction) from the split terminals 54, then are folded back by 180 degrees at the middle portion 5D, and extend in a leftward direction (a direction approaching the combining terminal 53 of the left splitter-combiner circuit 50AL, that is, a direction opposite to the predetermined direction). Thereby, the second-stage splitter-combiner circuit 50B is disposed to be aligned substantially below (or above) the right splitter-combiner circuit 50AR of the first stage as shown in FIGS. 1 and 2. Therefore, there is an empty space below (or above) the left splitter-combiner circuit 50AL of the first stage.

As in the first stage and the second stage described above, as shown in FIGS. 3 and 4, one of the two quarter-wave lines 51 includes a bent portion 55 formed to have a shape that is not parallel to the other quarter-wave line 51, a meandering shape, or a bent shape in the splitter-combiner circuit 50 in which two quarter-wave lines 51 are bent in the same direction.

That is, the first quarter-wave line 51F includes the bent portion 55 in which a part of the first quarter-wave line 51F is formed to be bent. The bent portion 55 has a portion that is not parallel to the second quarter-wave line 51S. A shape of the bent portion 55 is appropriately selected so that there is no difference in lengths of the two quarter-wave lines 51.

When the bent portion 55 is formed, occurrence of a difference in lengths between the two quarter-wave lines 51 can be prevented even if the two quarter-wave lines 51 are bent in the same direction.

As shown in FIGS. 1 and 2, between the upper circuit block group 300A and the second-stage splitter-combiner circuit 50B, the first-stage splitter-combiner circuits 50AL and 50AR and the second-stage splitter-combiner circuit 50B are aligned in order from the upper circuit block group 300A in a downward direction.

Similarly, between the lower circuit block group 300B and the second-stage splitter-combiner circuit 50B, the first-stage splitter-combiner circuits 50AL and 50AR and the second-stage splitter-combiner circuit 50B are aligned in order from the lower circuit block group 300B in an upward direction.

Therefore, the third-stage (final stage) splitter-combiner circuit 50C is disposed between the two second-stage splitter-combiner circuits 50B aligned in the vertical direction.

As shown in FIG. 4, the third-stage splitter-combiner circuit 50C includes two quarter-wave lines 51, that is, a first quarter-wave line 51F and a second quarter-wave line 51S. The two quarter-wave lines 51 extend in a leftward direction from split terminals 54. Specifically, each of the two quarter-wave lines 51 of the third-stage splitter-combiner circuit 50C is a meandering wiring extending in the leftward direction while meandering in the vertical direction. Thereby, a region occupied by the quarter-wave lines 51 in the left-right direction can be reduced while securing lengths of the two quarter-wave lines 51 of the third-stage splitter-combiner circuit 50C.

As shown in FIGS. 1 and 2, the combining terminal 53 of the third-stage splitter-combiner circuit 50C and the combining circuit block 4 are connected via the connection line 59.

In the splitter-combiner 1 of the first embodiment, the splitter-combiner circuits 50B and 50C of the second stage and third stage are disposed closer to a right portion of a region between the first-stage splitter-combiner circuits 50AL and 50AR located at a distance in the vertical direction. Thereby, the combining circuit block 4 can be disposed in an empty space on a left portion of the region between the first-stage splitter-combiner circuits 50AL and 50AR in the vertical direction. Also, a length of the connection line 59 connecting the combining terminal 53 of the third-stage splitter-combiner circuit 50C and the combining circuit block 4 can be small. Note that, for example, an external connection terminal, a bump, or the like of an IC (not shown) may be disposed in another empty space on a left portion of the region between the first-stage splitter-combiner circuits 50AL and 50AR in the vertical direction.

As described above, in the splitter-combiner 1 of the first embodiment, it is possible to reduce loss of power transmission in the splitter-combiner t in which the combining terminals 53 of two (S−1)th stage (S is an integer greater than or equal to two and less than or equal to n) splitter-combiner circuits 50 are connected to two split terminals 54 of one S-th stage splitter-combiner circuit 50.

Specifically, since the quarter-wave lines 51 are not symmetrically disposed with respect to a straight line passing through one combining terminal 53 and a midpoint of the two split terminals 54, positions of the combining terminal 53 and the split terminals 54 can be freely set to some extent. Therefore, even if the split terminals 54 of the two (S−1)th stage (for example, the first stage) splitter-combiner circuits 50 are located apart from each other, the two quarter-wave lines 51 of a predetermined splitter-combiner circuit 50 of the (S−1)th stage are bent to be close to another splitter-combiner circuit 50 of the (S−1)th stage, and thereby the combining terminals 53 of the two (S−1)th stage splitter-combiner circuits 50 can be located close to each other.

Thereby, a distance (electrical length of the absorption resistance 52) between the two split terminals 54 of one S-th stage (for example, the second stage) splitter-combiner circuit 50 connected to the combining terminals 53 of the two (S−1)th stage splitter-combiner circuits 50 can be reduced. That is, since the connection line 57 connecting the combining terminal 53 of the (S−1)th stage splitter-combiner circuit 50 and the split terminals 54 of the S-th stage splitter-combiner circuit 50 can be shortened or eliminated, loss of power transmission can be reduced.

From the above, the splitter-combiner 1 can be miniaturized, and loss of power transmission can be reduced.

Also, in the splitter-combiner 1 of the first embodiment, the first connection terminal 31F of the split circuit block 3 (the first circuit block) connected to the first end 54F which is the split terminal 54 and the second connection terminal 31S of the split circuit block 3 (the second circuit block) connected to the third end 54T which is the split terminal 54 are located at portions facing each other (that is, close to each other) in a direction in which the two the split circuit block 3 (the first circuit block and the second circuit block) are aligned. Therefore, since a connection line for connecting the split terminal 54 and the connection terminal 31 of the split circuit block 3 is not required in the first embodiment compared to a case in which the connection terminals 31 of the two split circuit blocks 3 are located far from each other, the splitter-combiner 1 can be miniaturized and loss of power transmission can be reduced.

Also, in the splitter-combiner 1 of the first embodiment, the $2^n/2$ (n is an integer greater than or equal to two) split circuit blocks 3 constitute the two circuit block groups 3M) aligned in a line in the left-right direction (the first direction). The two circuit block groups 300 are disposed at a distance in the vertical direction (the second direction).

Between the upper circuit block group 300A and the second-stage splitter-combiner circuit 50B, the first-stage splitter-combiner circuits 50AL and 50AR and the second-stage splitter-combiner circuit 50B are aligned in order in a downward direction from the upper circuit block group 300A.

Similarly, between the lower circuit block group 300B and the second-stage splitter-combiner circuit SOB, the first-stage splitter-combiner circuits 50AL and 50AR and the second-stage splitter-combiner circuit 50B are aligned in order in an upward direction from the lower circuit block group 300B.

Further, the n-th stage (for example, the third stage) splitter-combiner circuit 50 is disposed between the two splitter-combiner circuits 50 of the two (n−1)th stages (for example, the second stage) aligned in the vertical direction.

Therefore, compared to a case in which all $2^n$ split circuit blocks 3 are aligned in a line in the left-right direction (the first direction), even if a distance (an electrical length of the absorption resistance 52) between the two split terminals 54 of the n-th stage (final stage) splitter-combiner circuit 50 is reduced, the connection line connecting the combining terminal 53 of the (n−1)th stage splitter-combiner circuit 50 and the split terminal 54 of the n-th stage (the final stage) splitter-combiner circuit 50 can be shortened, or the connection line can be eliminated. Thereby, the splitter-combiner 1 can be further miniaturized, and loss of power transmission can be further reduced.

Second Embodiment

Next, a splitter-combiner according to a second embodiment will be described mainly with reference to FIGS. 5 and

6. In the following description, configurations common to those already described will be denoted by the same reference signs, and duplicate descriptions thereof will be omitted.

In a splitter-combiner 1X according to the second embodiment, at least a splitter-combiner circuit 50 constituting a first circuit stage includes a line bending circuit 5C. A first quarter-wave line 51F and a second quarter-wave line 51S of the splitter-combiner circuit 50 which constitutes at least one stage selected from a plurality of circuit stages from a second stage to a (n−1)th stage of circuit stages 60 extend on opposite sides to each other from a first split terminal and a second split terminal and are formed in a loop shape.

Figure 5:
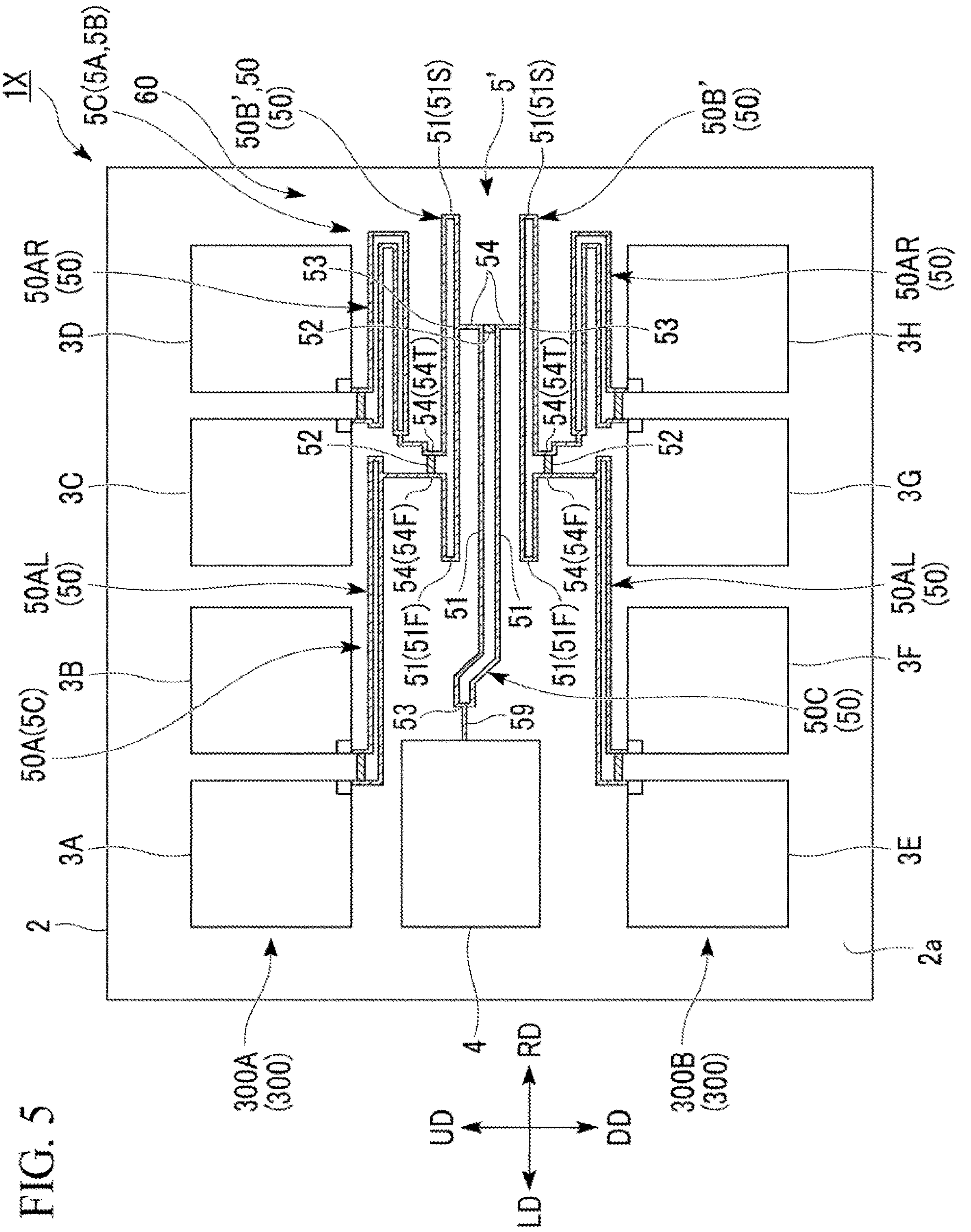
FIG. 5 is a plan view showing a splitter-combiner according to a second embodiment.

For example, as shown in FIG. 5, in a splitter-combiner circuit part 5' of the splitter-combiner 1X according to the second embodiment, first-stage splitter-combiner circuits 50AL and 50AR are the line bending circuits 5C in which two quarter-wave lines 51 are bent in the same direction as in the first embodiment. On the other hand, a second-stage splitter-combiner circuit 50B' is not the line bending circuit 5C unlike the first embodiment.

In the second-stage splitter-combiner circuit 50B' according to the second embodiment, two quarter-wave lines 51 extend in opposite directions to each other from two split terminals 54 and are formed in a loop shape.

Specifically, the splitter-combiner circuit 50B' includes the first quarter-wave line 51F and the second quarter-wave line 51S. The first quarter-wave line 51F extends from a first end 54F forming a first split terminal 54 toward a combining terminal 53 to form substantially a U-shape. The second quarter-wave line 51S extends from a third end 54T forming a second split terminal 54 toward the combining terminal 53 to form substantially a U-shape reversed to the first quarter-wave line 51F.

Thereby, the first quarter-wave line 51F and the second quarter-wave line 51S form an annular line.

Also, in the splitter-combiner 1X according to the second embodiment, two quarter-wave lines 51 of a third stage (final stage) splitter-combiner circuit 50C extend in a leftward direction from split terminals 54 as in the first embodiment. Here, the split terminals 54 are split terminals 54 of the splitter-combiner circuit 50B'. A combining terminal 53 of the splitter-combiner circuit 50C is connected to a combining circuit block 4 via a connection line 59.

In FIG. 5, the two quarter-wave lines 5I of the splitter-combiner circuit 50C extend without meandering, but may extend, for example, while meandering as in the first embodiment.

According to the splitter-combiner 1X of the second embodiment, the same effects as those the first embodiment are achieved.

Also, in the splitter-combiner 1X of the second embodiment, in the second-stage splitter-combiner circuit 50B', the two quarter-wave lines 51 extend on opposite sides to each other from the two split terminals 54 to be in a loop shape. Thereby, even when the quarter-wave lines 51 of the splitter-combiner circuit 50 are formed of a side-shielded microstrip line 500 shown in FIG. 6 attached, a metal density in the second-stage splitter-combiner circuit 50B' can be reduced to be low. This point will be described below.

Figure 6:
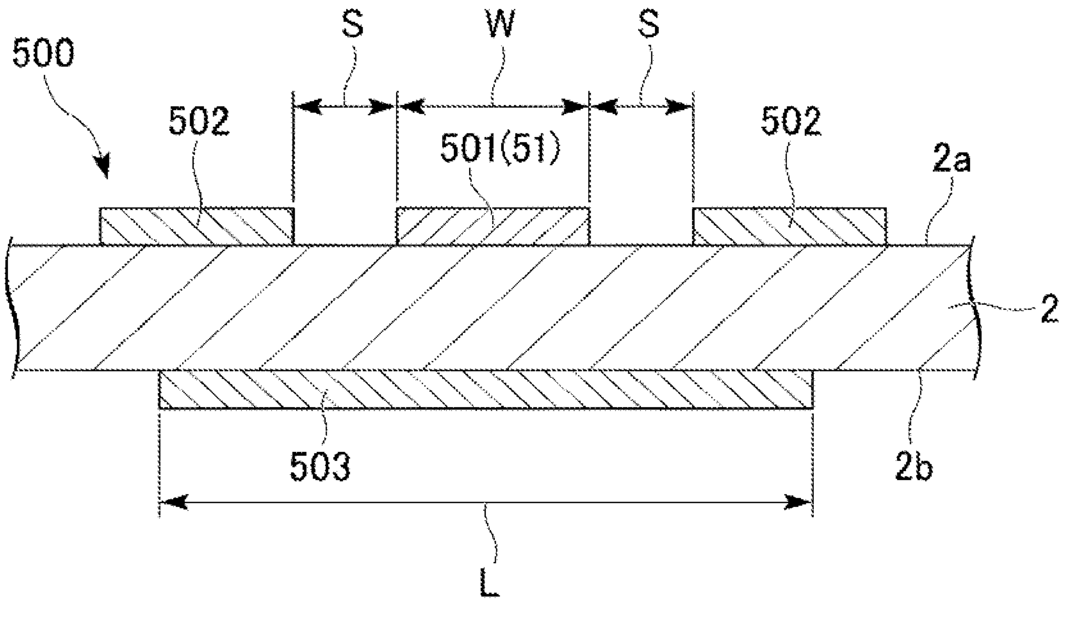
FIG. 6 is a cross-sectional view schematically showing a quarter-wave line constituting a splitter-combiner circuit in the second embodiment.

As shown in FIG. 6, the side-shielded microstrip line 500 includes a signal line 501 and two side ground wirings 502 formed on a first surface 2*a* of a substrate 2 to form the quarter-wave line 51, and a ground wiring 503 formed on a second surface 2*b* (a surface facing an opposite side of the first surface 2*a*) of the substrate 2. The side ground wirings 502 are disposed on both sides of the signal line 501 at intervals and extend parallel to the signal line 501. The ground wiring 503 is disposed to overlap the signal line 501 in a thickness direction of the substrate 2 and extends along the signal line 501. A line width L of the ground wiring 503 is represented by the following expression (2), in which W is a line width of the signal line 501 and S is a distance between the signal line 501 and each of the side ground wirings 502.

$$L > W + 2 \times S \qquad (2)$$

In the side-shielded microstrip line 500, the line width L of the ground wiring 503 increases as characteristic impedance increases. Therefore, in a case in which the quarter-wave line 51 is configured by the side-shielded microstrip line 500, when characteristic impedance in the second-stage splitter-combiner circuit 50B' is higher than characteristic impedances of the first-stage splitter-combiner circuits 50AL and 50AR, the line width L of the ground wiring 503 corresponding to the quarter-wave line 51 (the signal line 501) of the second stage is larger than the line width L of the ground wiring 503 of the first stage. Therefore, as in the first embodiment shown in FIGS. 1 to 4, when the second-stage splitter-combiner circuit 50B has the line bending circuit 5C, four ground wirings 503 of the second stage, which have a larger line width L than that of the first stage, are aligned in a vertical direction as in the quarter-wave lines 51. Therefore, a metal density of the second-stage splitter-combiner circuit 50B is higher than that of the first-stage right splitter-combiner circuit 50AR in which four ground wirings 503 having a small line width L are aligned in the vertical direction. As a result, the metal density of the second-stage splitter-combiner circuit 50B may exceed a limitation of a metal density in manufacturing.

On the other hand, in the splitter-combiner 1X of the second embodiment, the two quarter-wave lines 51 constituting the second-stage splitter-combiner circuit 50B' are formed in a loop shape. Therefore, in the second-stage splitter-combiner circuit 50B' in which the line width L of the ground wiring 503 is large, the number of ground wirings 503 aligned in the vertical direction can be reduced (two in the example of FIG. 5). Therefore, the metal density in the second-stage splitter-combiner circuit 50B' can be reduced to be low.

In the second embodiment, the number of stages in which the power of a high-frequency signal is combined or split in the splitter-combiner circuit part 5 is not limited to the third stage, and may be appropriately changed according to the number ($2^n$) of the split circuit blocks 3. When the number of the split circuit blocks 3 is $2^n$, the number of stages for combining and splitting the power of a high-frequency signal may be n (n is an integer). Then, the splitter-combiner circuit 50 in which two quarter-wave lines 51 are formed in a loop shape is not limited to being applied to the second-stage splitter-combiner circuit 50B', and may be applied to the splitter-combiner circuit 50 in at least one stage from the second stage to the (n−1)th stage. Even in this case, the effects described above are achieved.

Third Embodiment

Hereinafter, a cascade connection circuit according to a third embodiment will be described with reference to the drawings.

A cascade connection circuit 200 according to the third embodiment includes ($2^n$−1) splitter-combiner circuits 150 forming a splitter-combiner 101 corresponding to the splitter-combiner 1 according to the first embodiment, and n circuit stages 160 (n is an integer greater than or equal to two) in which ($2^n$−1) splitter-combiner circuits 150 are connected stepwise. In the present embodiment, n is 3. Therefore, the cascade connection circuit 200 includes three circuit stages 160.

Figure 7:
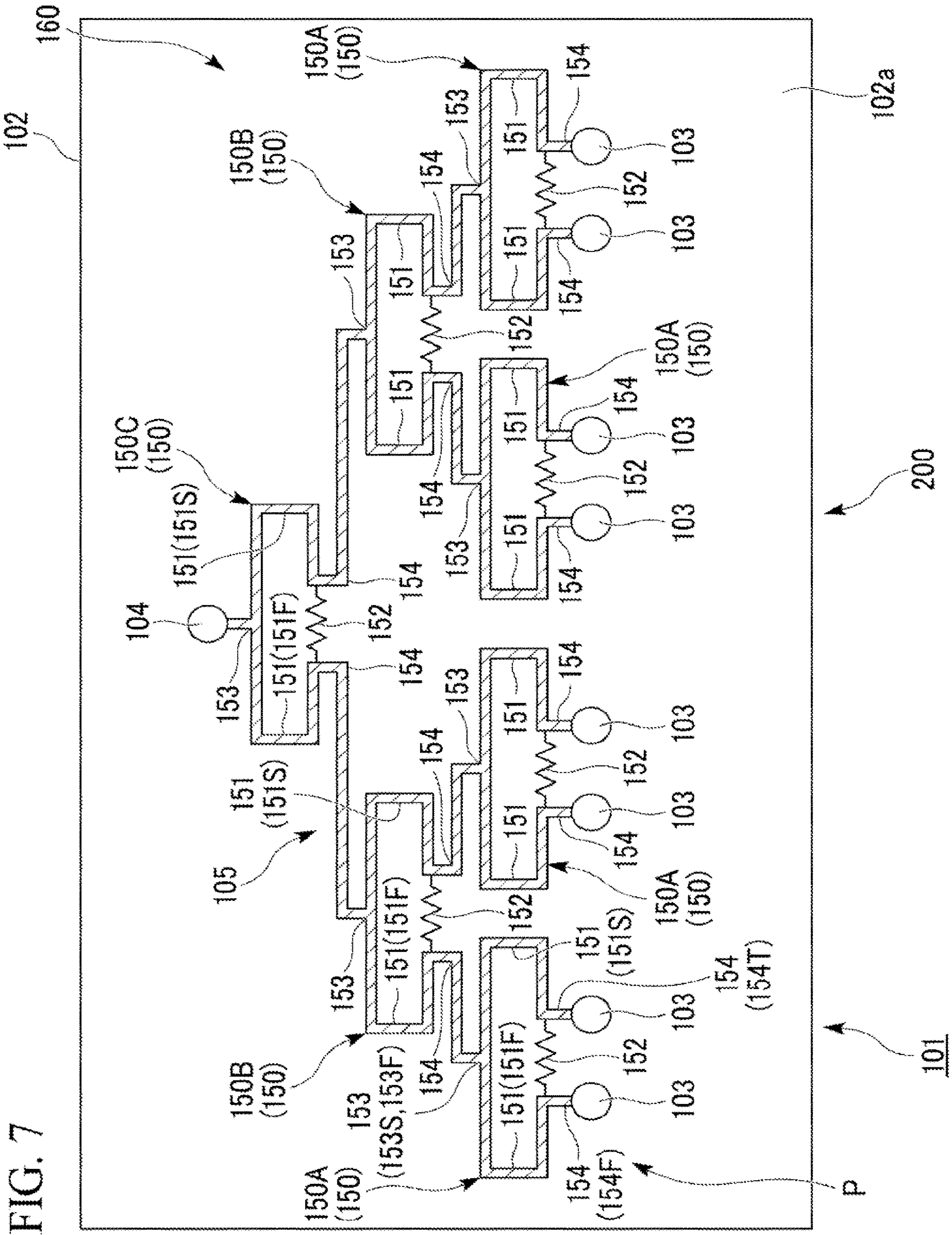
FIG. 7 is a schematic view showing a splitter-combiner according to a third embodiment.

As shown in FIG. 7, the splitter-combiner 101 includes a splitter-combiner circuit part 105 provided on a substrate 102. The splitter-combiner circuit part 105 includes ($2^n$−1) splitter-combiner circuits 150. Each of the splitter-combiner circuits 150 corresponds to the splitter-combiner circuit 50 according to the first embodiment.

Further, n may be 2 or may be 4 or more.

The splitter-combiner circuit part 105 includes $2^n$ (n is an integer greater than or equal to two) split input/output terminals 103 and one combining input/output terminal 104. In the splitter-combiner circuit part 105, the power of high-frequency signals such as microwaves, millimeter waves, or the like that has been input (or received) to the $2^n$ split input/output terminals 103 can be combined into one, and then can be output (or transmitted) to the outside from the combining input/output terminal 104.

Also, in the splitter-combiner circuit part 105, the power of a high-frequency signal input (or received) to the combining input/output terminal 104 can be split into $2^n$, and then can be output (or can be transmitted) to the outside from the $2^n$ split input/output terminals 103.

The splitter-combiner circuit part 105 includes ($2^n$−1) splitter-combiner circuits 150 for $2^n$ split input/output terminals 103. The number of splitter-combiner circuits 150 in the shown example is seven.

As shown in FIG. 7, in an S-th stage (S is an integer greater than or equal to two and less than or equal to n) of the three circuit stages 160, a first circuit stage 160 includes $2^n$ split terminals 154 in total including first split terminals and second split terminals. Furthermore, the first circuit stage 160 is constituted by $2^n/2$ splitter-combiner circuits 150. The first split terminal and the second split terminal of the splitter-combiner circuit 150 constituting the S-th circuit stage 160 are connected to combining terminals of two splitter-combiner circuits 150 constituting an (S−1)th circuit stage 160.

Figure 8:
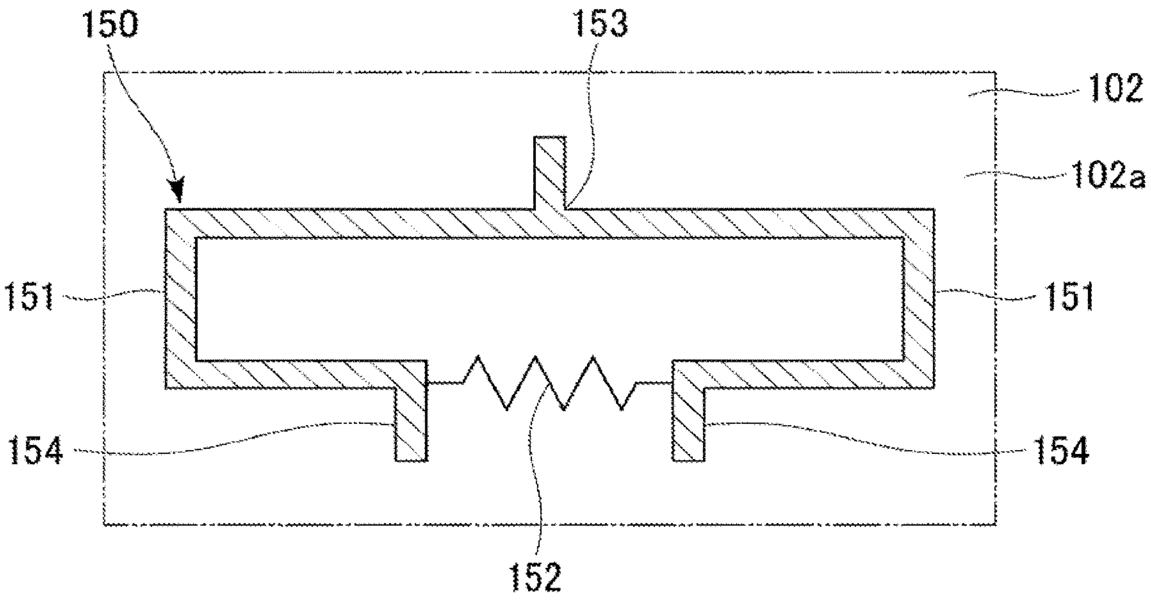
FIG. 8 is a schematic view showing a splitter-combiner circuit constituting the splitter-combiner of FIG. 7.

As shown in FIGS. 7 and 8, the splitter-combiner circuit 150 includes two quarter-wave lines 151, one absorption resistance 152, and one combining terminal 153.

In the following description, a structure of the splitter-combiner circuit 150 will be described by taking one splitter-combiner circuit 150 indicated by reference sign P in FIG. 7 as an example. The structure of the splitter-combiner circuit 150 indicated by reference sign P is also applied to the other six splitter-combiner circuits 150.

In the splitter-combiner circuit 150, one of the two quarter-wave lines 151 is a first quarter-wave line 151F. The other of the two quarter-wave lines 151 is a second quarter-wave line 151S.

The first quarter-wave line 151F includes a first end 154F forming a first split terminal 154 and a second end 153S located on an opposite side of the first end 154F.

The second quarter-wave line 151S includes a third end 154T forming a second split terminal 154 and a fourth end 153F located on an opposite side of the third end 154T.

In the following description, the first quarter-wave line 151F and the second quarter-wave line 151S may each be simply referred to as a quarter-wave line 151.

The quarter-wave line 151 is made of, for example, a conductor formed on a first surface 102*a* of the substrate 102 and extends linearly. Lengths of the two quarter-wave lines 151 are equal to each other. The first end 154F of the first quarter-wave line 151F in a length direction is the split terminal 154. Similarly, the third end 154T of the second quarter-wave line 151S in a length direction is the split terminal 154.

The absorption resistance 152 is provided between the first end 154F (the split terminal 154) of the first quarter-wave line 151F and the third end 154T (the split terminal 154) of the second quarter-wave line 151S. The combining terminal 153 is formed by connecting the second end 153S and the fourth end 153F of the two quarter-wave lines 151.

In the third embodiment, the first quarter-wave line 151F and the second quarter-wave line 151S of the splitter-combiner circuit 150 are each formed of a side-shielded microstrip line 500 shown in FIG. 6. A relationship between a line width L of a ground wiring 503, a line width W of a signal line 501 constituting the quarter-wave line 151, and a distance S between the signal line 501 and each of side ground wirings 502 is represented by expression (2) described above.

As shown in FIG. 7, four of the seven splitter-combiner circuits 150 are first-stage splitter-combiner circuits 150A. The four first-stage splitter-combiner circuits 150A includes eight split terminals 154 in total. These eight split terminals 154 are connected to the eight split input/output terminals 103 to have a one-to-one correspondence.

Another two of the seven splitter-combiner circuits 150 are second-stage splitter-combiner circuits 150B. Two split terminals 154 of the second-stage splitter-combiner circuit 150B are connected to the combining terminals 153 of two first-stage splitter-combiner circuits 150A, respectively.

The remaining one of the seven splitter-combiner circuits 150 is a third-stage splitter-combiner circuit 150C. Two split terminals 154 of the third-stage splitter-combiner circuit 150C are connected to the combining terminals 153 of two second-stage splitter-combiner circuits 150B, respectively. Also, the combining terminal 153 of the third-stage splitter-combiner circuit 150C is connected to the combining input/output terminal 104.

The splitter-combiner circuit part 105 of FIG. 7 is configured to combine or split the power of a high-frequency signal in three stage. Note that, the number of stages for combining or splitting the power of a high-frequency signal in the splitter-combiner circuit part 105 is appropriately changed according to the number ($2^n$) of the split input/output terminals 103. When the number of the split input/output terminals 103 is $2^n$, the number of stages for combining and splitting the power of a high-frequency signal is n (n is an integer greater than or equal to two). In this case, two split terminals 154 of each S-th stage (S is an integer greater than or equal to two and less than or equal to n) splitter-combiner circuit 150 may be connected to combining terminals 153 of two (S−1)th stage splitter-combiner circuits 150.

In the splitter-combiner 101 of the third embodiment, combined impedance (hereinafter, also referred to as final combined impedance) in the combining terminal 153 of the third stage (final stage, n-th stage) splitter-combiner circuit 150C is higher than split impedance (hereinafter, also referred to as final split impedance) in the split terminal 154 of the first-stage splitter-combiner circuit 150A. That is, the splitter-combiner 101 also carries a function of converting impedance between the final split impedance and the final combined impedance in addition to the function of combining or splitting power.

Specifically, as shown in Table 1, the final combined impedance at the combining terminal 153 of the third-stage splitter-combiner circuit 150C is 50 (Ω), and the final split impedance at the split terminal 154 of the first-stage splitter-combiner circuit 150A is 25 (Ω).

TABLE 1

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) | LINE WIDTH L (μm) OF GROUND WIRING |
|---|---|---|---|---|
| FIRST STAGE | 40 | 10 | 25/32 | LARGER THAN 20 |
| SECOND STAGE | 40 | 10 | 32/25 | LARGER THAN 20 |
| THIRD STAGE | 50 | 8 | 25/50 | LARGER THAN 28 |

In the splitter-combiner 101 of the third embodiment, as shown in Table 1, the line widths W (see FIG. 6) of the quarter-wave lines 151 of the first stage and the second stage (two continuous stages from the first stage to an (n−1)th stage) are equal to each other. That is, in the circuit stages 160, in the splitter-combiner circuits 150 constituting at least one set of two continuous stages, a line width of the first quarter-wave line 151F of the splitter-combiner circuit 150 constituting one stage and a line width of the first quarter-wave line 151F of the splitter-combiner circuit 150 constituting the other stage are equal to each other, and a line width of the second quarter-wave line 151S of the splitter-combiner circuit 150 constituting one stage and a line width of the second quarter-wave line 151S of the splitter-combiner circuit 150 constituting the other stage are equal to each other.

Also, the line width W of the quarter-wave line 151 (the first quarter-wave line 151F and the second quarter-wave line 151S) of the first stage and the second stage is larger than the line width W of the quarter-wave line 151 (the first quarter-wave line 151F and the second quarter-wave line 151S) of the third stage (n-th stage). In Table 1, the line width W of the quarter-wave line 151 of the first stage and the second stage is 10 (μm), and the line width W of the quarter-wave line 151 of the third stage is 8 (μm).

In order to set the line width W of the quarter-wave line 151 of each stage as described above, characteristic impedances of the quarter-wave lines 151 of the first stage and the second stage may be equal to each other. Also, the characteristic impedances of the quarter-wave lines 151 of the first stage and the second stage may be smaller than a characteristic impedance of the quarter-wave line 151 of the third stage. In Table 1, the characteristic impedances of the quarter-wave lines 151 of the first stage and the second stage are each set to 40 (Ω), and the characteristic impedance of the quarter-wave lines 151 of the third stage is set to 50 (Ω).

In order to set the characteristic impedance of the quarter-wave line 151 of each stage as described above, a split impedance Zin and a combined impedance Zout at each stage may be set on the basis of the above-described expression (1) (expression showing a relationship between a characteristic impedance Zo (Ω) of the quarter-wave line 151, the split impedance Zin (Ω) of the split terminal 154, and the combined impedance Zout (Ω) of the combining terminal 153 in each splitter-combiner circuit 150).

Further, the combining terminal 153 of the (S−1)th stage and the split terminal 154 of the S-th stage are connected to each other. Therefore, the combined impedance Zout of the (S−1)th stage is equal to the split impedance Zin of the S-th stage.

Specifically, in the first stage, since the characteristic impedance Zo is determined to be 40 (Ω), and the split impedance Zin is determined to be 25 (Ω) which is the final split impedance, the combined impedance Zout of the first stage is set to 32 (Ω) from expression (1).

In the second stage, the characteristic impedance 7D is set to 40 (Ω), and the split impedance Zin is set to 32 (Ω) which is equal to the combined impedance Zout of the first stage. Therefore, the combined impedance Zout of the second stage is set to 25 (Ω) from expression (1).

In the third stage, the characteristic impedance Zo is set to 50 (Ω), and the split impedance Zin is set to 25 (Ω) which is equal to the combined impedance Zout of the second stage. Therefore, the combined impedance Zout of the third stage can be set to 50 (Ω), which is the final combined impedance, from the above-described expression (1).

The term "terminal impedance" as used in the following description means a combined impedance in a low stage and a split impedance of a high stage of two continuous stages.

In the splitter-combiner circuit part 105 of the third embodiment, a value of a terminal impedance between the first stage and the second stage (combined impedance Zout of the first stage=split impedance Zin of the second stage) is larger than a value of the final split impedance and smaller than a value of the final combined impedance. Also, a value of a terminal impedance between the second and third stages (combined impedance Zout of the second stage=split impedance Zin of the third stage) is equal to a value of the final split impedance.

The quarter-wave line 151 of the third embodiment is formed of the side-shielded microstrip line 500 shown in FIG. 6. Therefore, since the distance S between the signal line 501 and each side ground wiring 502 becomes larger while the line width W of the quarter-wave line 151 becomes smaller as the characteristic impedance of the quarter-wave line 151 becomes larger, the line width L of the ground wiring 503 becomes larger. For example, as shown in Table 1, when the characteristic impedance of the quarter-wave line 151 is 40 (Ω) (when the line width W of the quarter-wave line 151 is 10 (μm)), the line width L of the ground wiring 503 is larger than 20 (μm). Also, when the characteristic impedance of the quarter-wave line 151 is 50 (Ω) (when the line width W of the quarter-wave line 151 is 8 (μm)), the line width L of the ground wiring 503 is larger than 28 (μm).

In the third embodiment, since the characteristic impedances (line width W) of the quarter-wave lines 151 of the first stage and the second stage are equal to each other, the line widths L of the ground wirings 503 of the first stage and the second stage can be equal to each other.

TABLE 2

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) | LINE WIDTH L (μm) OF GROUND WIRING |
|---|---|---|---|---|
| FIRST STAGE | 40 | 10 | 25/32 | LARGER THAN 20 |
| SECOND STAGE | 50 | 8 | 32/40 | LARGER THAN 28 |
| THIRD STAGE | 63 | 4 | 40/50 | LARGER THAN 34 |

Table 2 is a reference example showing the characteristic impedance Zo of the quarter-wave line 151, the line width L of the ground wiring 503, the split impedance Zin, and the combined impedance Zout of each stage when the line width W of the quarter-wave line 151 of the splitter-combiner circuit 150 is reduced each time the stage becomes higher from the first stage to the third stage as in a conventional splitter-combiner. In the reference example shown in Table 2, from the first stage to the third stage, the characteristic impedance Zo increases each time the stage becomes higher, and the line width L of the ground wiring 503 also increases each time the stage becomes higher. Furthermore, a value of the terminal impedance between two adjacent stages (combined impedance Zout of the lower stage=split impedance Zin of the higher stage) increases each time the stage becomes higher in a range of larger than a value of the final split impedance of the first stage and smaller than a value of the final combined impedance of the third stage.

As described above, in the splitter-combiner 101 of the third embodiment, the line widths W of the quarter-wave lines 151 of the first stage and the second stage (at least one set of two adjacent stages from the first stage to the (n−1) stage) are equal to each other. Therefore, even when the quarter-wave line 151 is formed of the side-shielded microstrip line 500, the line widths L of the ground wirings 503 of the first stage and the second stage can be equal to each other. Thereby, even when the quarter-wave lines 151 of the first stage and the second stage are similarly bent, a metal density in the second-stage (a high stage of two adjacent stages) splitter-combiner circuit 150B can be reduced to the same level as a metal density in the first-stage (a low stage of the two adjacent stages) splitter-combiner circuit 150A. This point will be described below.

As described above, in the side-shielded microstrip line 500, since the distance S between the signal line 501 and each side ground wiring 502 becomes larger while the line width W of the quarter-wave line 151 becomes smaller as the characteristic impedance becomes larger, the line width L of the ground wiring 503 becomes larger.

Therefore, in a case in which the quarter-wave line 151 is formed of the side-shielded microstrip line 500, when the characteristic impedance in the second-stage splitter-combiner circuit 150B is higher than the characteristic impedance in the first-stage splitter-combiner circuit 150A as shown in Table 2, the line width L of the ground wiring 503 corresponding to the quarter-wave line 151 (the signal line 501) of the second stage is larger than the line width L of the ground wiring 503 of the first stage. Therefore, when the quarter-wave line 151 of the second-stage splitter-combiner circuit 150B is bent similarly to the quarter-wave line 151 of the right splitter-combiner circuit 150AR of the first stage, four ground wirings 503 of the second stage, which have a larger line width L than of the first stage, are aligned in the vertical direction similarly to the quarter-wave lines 151. Therefore, a metal density of the second-stage splitter-combiner circuit 150B is higher than that of the right splitter-combiner circuit 150AR of the first stage in which four ground wirings 503 having a small line width L are aligned in the vertical direction. As a result, the metal density of the second-stage splitter-combiner circuit 150B may exceed a limitation of the metal density in manufacturing.

On the other hand, as shown in Table 1, in the splitter-combiner 101 of the third embodiment, the line widths W of the quarter-wave lines 151 of the first stage and the second stage are equal to each other. Therefore, the line widths L of the ground wirings 503 of the first stage and the second stage can be equal to each other. Thereby, even when the quarter-wave line 151 of the second-stage splitter-combiner circuit 150B is bent similarly to the quarter-wave line 151 of the right splitter-combiner circuit 150AR of the first stage, the metal density of the second-stage splitter-combiner circuit 150B can be the same level as the metal density of the right splitter-combiner circuit 150AR of the first stage. That is, the metal density of the second-stage splitter-combiner circuit 150B can be reduced to be low.

Fourth Embodiment

Hereinafter, a cascade connection circuit according to a fourth embodiment will be described with reference to the drawings. In the fourth embodiment, members the same as those in the first to third embodiments will be denoted by the same reference signs, and description thereof will be omitted or simplified.

As shown in FIG. 7, a splitter-combiner 101 according to the fourth embodiment has the same configuration as the splitter-combiner 101 according to the third embodiment.

In circuit stages 160, in splitter-combiner circuits 150 constituting at least one set of two continuous stages, a line width of a first quarter-wave line 151F of the splitter-combiner circuit 150 and a line width of a second quarter-wave line 151S of the splitter-combiner circuit 150 are equal to each other.

In order to make the characteristic impedances of the quarter-wave lines 151 of all the stages equal to each other, a split impedance Zin and a combined impedance Zout of each stage may be set on the basis of the above-described expression (1) (expression showing a relationship between a characteristic impedance Zo (Ω) of the quarter-wave line 151, the split impedance Zin (Ω) of a split terminal 154, and the combined impedance Zout (Ω) of the combining terminal 153 in each splitter-combiner circuit 150).

Further, the combining terminal 153 of an (S−1)th stage and the split terminal 154 of an S-th stage are connected to each other. Therefore, the combined impedance Zout of the (S−1)th stage is equal to the split impedance Zin of the S-th stage.

Specifically, in the first stage, since the characteristic impedance Zo is determined to be 50 (Ω), and the split impedance Zin is determined to be 25 (Ω) which is the final split impedance, the combined impedance Zout of the first stage is set to 50 (Ω) from the above-described expression (1).

In the second stage, the characteristic impedance Zo is determined to be 50 (Ω), and the split impedance Zin is determined to be 50 (Ω) which is equal to the combined impedance Zout of the first stage. Therefore, the combined impedance Zout of the second stage is set to 25 (Ω) from the above-described expression (1).

In the third stage, the characteristic impedance Zo is determined to be 50 (Ω), and the split impedance Zin is determined to be 25 (Ω) which is equal to the combined impedance Zout of the second stage. Therefore, the combined impedance Zout of the third stage can be set to 50 (Ω), which is the final combined impedance, from the above-described expression (1).

In the splitter-combiner circuit part 105 of the fourth embodiment, a value of the terminal impedance between stages adjacent to each other (combined impedance Zout of the (S−1)th stage=split impedance Zin of the S-th stage) is set so that a value of the final combined impedance and a value of the final split impedance are repeated from the split side to the combining side.

In the splitter-combiner 101 of the fourth embodiment, the line widths W of the quarter-wave lines 151 of all the stages from the first stage to the n-th stage are equal to each other. Therefore, even when power flowing in the quarter-wave line 151 increases as the stage becomes higher as viewed from the split side, since a proportion of Joule loss of power at a high stage (for example, the third stage) is reduced, power durability in the high stage can be enhanced and thus reliability of the splitter-combiner 101 can be improved.

TABLE 3

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) |
|---|---|---|---|
| FIRST STAGE | 50 | 8 | 25/50 |
| SECOND STAGE | 50 | 8 | 50/25 |
| THIRD STAGE | 50 | 8 | 25/50 |

Specifically, in the splitter-combiner 101 of the fourth embodiment, as shown in Table 3, line widths W (see FIG. 6) of the quarter-wave lines 151 of all the stages from a first stage to a third stage are equal to each other. In Table 3, the line width W of the quarter-wave line 151 of all the stages is 8 (μm).

In order to make the line widths W of the quarter-wave lines 151 of all the stages equal to each other, characteristic impedances of the quarter-wave lines 151 of all the stages may be equal to each other. In Table 3, the characteristic impedance of the quarter-wave line 151 of all the stages is set to 50 (Ω) which is the same as a final combined impedance at a combining terminal 153 of a third-stage splitter-combiner circuit 150C.

Further, the configuration in which the line widths W of the quarter-wave lines 151 of all the stages from the first stage to the n-th stage are equal to each other is applicable not only to the splitter-combiner whose final combined impedance is higher than the final split impedance but also to a splitter-combiner in which the final combined impedance and the final split impedance are equal.

Fifth Embodiment

Next, a cascade connection circuit according to a fifth embodiment will be described. In the fifth embodiment, members the same as those in the first to fourth embodiments will be denoted by the same reference signs, and description thereof will be omitted or simplified.

As shown in FIG. 7, a splitter-combiner 101 according to the fifth embodiment has the same configuration as the splitter-combiner 101 of the third embodiment. On the other hand, the fifth embodiment is different from the third embodiment in terms of the line width.

In the fifth embodiment, of circuit stages 160 having n stages, S circuit stages (S is an integer greater than or equal to two and less than or equal to n) and i circuit stages (i is an integer greater than or equal to two and less than or equal to (n−1)) will be described.

Line widths of a plurality of first quarter-wave lines 151F of a plurality of splitter-combiner circuits 150 constituting the circuit stages 160 from the i-th stage to the n-th stage are equal to each other.

Line widths of a plurality of second quarter-wave lines 151S of the plurality of splitter-combiner circuits 150 constituting the circuit stages 160 from the i-th stage to the n-th stage are equal to each other.

The first quarter-wave line 151F and the second quarter-wave line 151S of each of the plurality of splitter-combiner circuits 150 constituting the circuit stages 160 from the i-th stage to the n-th stage have first line widths.

Of a plurality of line widths of the first quarter-wave line 151F and the second quarter-wave line 151S of the splitter-combiner circuit 150 in the plurality of splitter-combiner circuits 150 constituting the circuit stages 160 from the first stage to an (i−1)th stage, a maximum line width is a second line width. The first line width is larger than the second line width. Details will be described below.

Also, in the splitter-combiner 101 of the fifth embodiment, similarly to the third embodiment, a combined impedance (final combined impedance) at a combining terminal 153 of the third stage (final stage) is higher than a split impedance (final split impedance) at a split terminal 154 of the first stage. Specifically, in the splitter-combiner 101 of the fifth embodiment, the final combined impedance is 50 (Ω), and the final split impedance is 25 (Ω) as shown in Table 4.

second stage to the third stage may be equal to each other and smaller than a characteristic impedance of the quarter-wave line 151 of the first stage. In Table 4, the characteristic impedance of the quarter-wave line 151 of the first stage is set to 50 (Ω), and the characteristic impedance of the second and third stages is set to 40 (Ω).

In order to set the characteristic impedance of the quarter-wave line 151 of each stage as described above, a split impedance Zin and a combined impedance Zout of each stage may be set on the basis of expression (1) described in the fourth embodiment. Note that, the combined impedance Zout of an (S−1)th stage is equal to the split impedance Zin of an S-th stage.

Specifically, in the first stage, since the characteristic impedance Zo is determined to be 50 (Ω), and the split impedance Zin is determined to be 25 (Ω) which is the final split impedance, the combined impedance Zout of the first stage is set to 50 (Ω) from expression (1).

In the second stage, the characteristic impedance Zo is determined to be 40 (Ω), and the split impedance Zin is determined to be 50 (Ω) which is equal to the combined impedance Zout of the first stage. Therefore, the combined impedance Zout of the second stage is set to 16 (Ω) from expression (1).

In the third stage, the characteristic impedance Zo is determined to be 40 (Ω), and the split impedance Zin is determined to be 16 (Ω) which is equal to the combined impedance Zout of the second stage. Therefore, the combined impedance Zout of the third stage can be set to 50 (Ω), which is the final combined impedance, from the above-described expression (1).

In a splitter-combiner circuit part 105 of the fifth embodiment, a value of a terminal impedance between the first stage and the second stage (combined impedance Zout of the first stage=split impedance Zin of the second stage) is equal to a value of the final combined impedance. Also, a value of a terminal impedance between the second stage and the third stage (combined impedance Zout of the second stage=split impedance Zin of the third stage) is smaller than a value of the final split impedance.

In the splitter-combiner 101 of the fifth embodiment, the line widths W of the quarter-wave lines 151 of the stages from the second stage to the n-th stage are equal to each other and larger than the line width W of the quarter-wave line 151 of the first stage. Therefore, even when power

TABLE 4

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) |
|---|---|---|---|
| FIRST STAGE | 50 | 8 | 25/50 |
| SECOND STAGE | 40 | 10 | 50/16 |
| THIRD STAGE | 40 | 10 | 16/50 |

In the splitter-combiner 101 of the fifth embodiment, as shown in Table 4, line widths W of the quarter-wave lines 151 of the stages from the second stage to the third stage (see FIG. 6) are equal to each other and larger than the line width W of the quarter-wave line 151 of the first stage. In Table 4, the line width W (the second line width) of the quarter-wave line 151 of the first stage is 8 (μm), and the line width W (the first line width) of the quarter-wave line 151 of the second and third stages is 10 (μm).

In order to set the line width W of the quarter-wave line 151 of each stage as described above, characteristic impedances of the quarter-wave lines 151 of the stages from the flowing in the quarter-wave line 151 increases as the stage becomes higher as viewed from the split side, since a proportion of Joule loss of power at a high stage (for example, the third stage) is reduced, power durability in the high stage can be enhanced and thus reliability of the splitter-combiner 101 can be improved.

In the fifth embodiment, the line widths W of the quarter-wave lines 151 of the stages from the i-th stage (i is an integer greater than or equal to two and less than or equal to (n−1)) to the n-th stage may be equal to each other and larger than the line width W of the quarter-wave line 151 of the stages from the first stage to the (i−1)th stage at the least. For example, when the splitter-combiner circuit part 105 is configured to combine or split the power of a high-frequency signal of five stages, for example, the line widths W of the quarter-wave lines 151 of the stages from the fourth stage to the fifth stage may be equal to each other and larger than the line width W of the quarter-wave line 151 of the stages from the first stage to the third stage. Even with such a configuration, the effects described above are achieved.

Further, the configuration in which the line widths W of the quarter-wave lines 151 of the stages from the i-th stage to the n-th stage are equal to each other and larger than the line widths W of the quarter-wave lines 151 of the stages from the first stage to the (i−1)th stage is applicable not only to the splitter-combiner whose final combined impedance is higher than the final split impedance but also to a splitter-combiner in which the final combined impedance and the final split impedance are equal.

Sixth Embodiment

Next, a cascade connection circuit according to a sixth embodiment will be described. In the sixth embodiment, members the same as those in the first to fifth embodiments will be denoted by the same reference signs, and description thereof will be omitted or simplified.

As shown in FIG. 7, a splitter-combiner 101 according to the sixth embodiment has the same configuration as the splitter-combiner 101 of the third embodiment. On the other hand, the sixth embodiment is different from the third embodiment in tennis of the line width.

In two or more circuit stages 160 selected from the circuit stages 160 having a plurality of stages from a first stage to an n-th stage and aligned to be continuous, a line width of a first quarter-wave line 151F and a line width of a second quarter-wave line 151S of a splitter-combiner circuit 150 constituting the circuit stage 160 increase sequentially as the number of stages of the circuit stages 160 increases.

Also, in the splitter-combiner 101 of the sixth embodiment, similarly to the third embodiment, a combined impedance (final combined impedance) at a combining terminal 153 of the third stage (final stage) is higher than a split impedance (final split impedance) at a split terminal 154 of the first stage. Specifically, in the splitter-combiner 101 of the sixth embodiment, the final combined impedance is 50 (Ω), and the final split impedance is 25 (Ω) as shown in Table 5.

impedance of the quarter-wave line 151 may decrease from the first stage to the third stage. In Table 5, the characteristic impedance of the quarter-wave line 151 of the first stage is set to 57 (Ω), and the characteristic impedance of the second stage is set to 40 (Ω). Furthermore, the characteristic impedance of the third stage is set to 35 (Ω).

In order to set the characteristic impedance of the quarter-wave line 151 of each stage as described above, a split impedance Zin and a combined impedance Zout of each stage may be set on the basis of expression (1) described in the fourth embodiment. Note that, the combined impedance Zout of an (S−1)th stage is equal to the split impedance Zin of an S-th stage.

Specifically, in the first stage, since the characteristic impedance Zo is determined to be 57 (Ω), and the split impedance Zin is determined to be 25 (Ω) which is the final split impedance, the combined impedance Zout of the first stage is set to 65.3 (Ω) from expression (1).

In the second stage, the characteristic impedance Zo is determined to be 40 (Ω), and the split impedance Zin is determined to be 65.3 (Ω) which is equal to the combined impedance Zout of the first stage. Therefore, the combined impedance Zout of the second stage is set to 12.25 (Ω) from expression (1).

In the third stage, the characteristic impedance Zo is determined to be 35 (Ω), and the split impedance Zin is determined to be 12.25 (Ω) which is equal to the combined impedance Zout of the second stage. Therefore, the combined impedance Zout of the third stage can be set to 50 (Ω), which is the final combined impedance, from the above-described expression (1).

In a splitter-combiner circuit part 105 of the sixth embodiment, a value of a terminal impedance between the first stage and the second stage (combined impedance Zout of the first stage=split impedance Zin of the second stage) is larger than a value of the final combined impedance. Also, a value of a terminal impedance between the second stage and the third stage (combined impedance Zout of the second stage=split impedance Zin of the third stage) is smaller than a value of the final split impedance.

In the splitter-combiner 101 of the sixth embodiment, the line widths W of the quarter-wave lines 151 of the stages from the first stage to the n-th stage are different from each other, and the line width W increases from the first stage to the n-th stage. Therefore, even when power flowing in the

TABLE 5

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) |
|---|---|---|---|
| FIRST STAGE | 57 | 3.5 | 25/65.3 |
| SECOND STAGE | 40 | 10 | 65.3/12.25 |
| THIRD STAGE | 35 | 20 | 12.25/50 |

In the splitter-combiner 101 of the sixth embodiment, as shown in Table 5, line widths W (see FIG. 6) of the quarter-wave lines 151 of the stages from the first stage to the third stage are different from each other and the line width W increases from the first stage to the third stage. In Table 5, the line width W of the quarter-wave line 151 of the first stage is 3.5 (μm), and the line width W of the quarter-wave line 151 of the second stage is 10 (μm). Furthermore, the line width W of the quarter-wave line 151 of the third stage is 20 (μm).

In order to set the line width W of the quarter-wave line 151 of each stage as described above, a characteristic quarter-wave line 151 increases as the stage becomes higher as viewed from the split side, since a proportion of Joule loss of power at a high stage (for example, the third stage) is reduced, power durability in the high stage can be enhanced and thus reliability of the splitter-combiner 101 can be improved.

In the splitter-combiner 101 of the sixth embodiment, the line width W of the quarter-wave line 151 of two or more stages aligned to be continuous in stages from the first stage to the n-th stage may increase from a low stage to a high stage as viewed from the split side at the least. For example, the splitter-combiner 101 of the sixth embodiment may include a line width increasing section in which the line width W of the quarter-wave line 151 increases from a low stage (split-side stage) to a high stage (combining-side stage) of two or more stages aligned to be continuous, and a line width maintaining section in which the line widths W of the quarter-wave lines 151 of two or more stages aligned to be continuous are equal to each other. In this case, when viewed from a low stage side, one line width increasing section and one line width maintaining section may be aligned in order, or one line width maintaining section and one line width increasing section may be aligned in order. Also, a plurality of line width increasing sections and line width maintaining sections may be alternately aligned. Even with such a configuration, the effects described above are achieved.

Further, the configuration in which the line width W of the quarter-wave line 151 of two or more stages aligned to be continuous in stages from the first stage to the n-th stage increases from a low stage to a high stage is applicable not only to the splitter-combiner whose final combined impedance is higher than the final split impedance but also to a splitter-combiner in which the final combined impedance and the final split impedance are equal.

Seventh Embodiment

Next, a cascade connection circuit according to a seventh embodiment will be described. In the seventh embodiment, members the same as those in the first to sixth embodiments will be denoted by the same reference signs, and description thereof will be omitted or simplified.

As shown in FIG. 7, a splitter-combiner 101 according to the seventh embodiment has the same configuration as the splitter-combiner 101 of the third embodiment. On the other hand, the seventh embodiment is different from the third embodiment in terms of the split impedance and the combined impedance.

Here, a combined impedance Zout of the low stage is equal to a split impedance Zin of the high stage.

For example, in a first stage and a second stage, the combined impedance Zout of the first stage and the split impedance Zin of the second stage are terminal impedances. Similarly, in the second stage and a third stage, the combined impedance Zout of the second stage and the split impedance Zin of the third stage are terminal impedances.

Next, in the seventh embodiment, of circuit stages 160 having n stages, S circuit stages (S is an integer greater than or equal to two and less than or equal to n) and j circuit stages (j is an integer greater than or equal to two and less than or equal to n) will be described.

A first split terminal 154 and a second split terminal 154 of a splitter-combiner circuit 150 constituting an S-th circuit stage 160 are connected to combining terminals 153 of two splitter-combiner circuits 150 constituting an (S−1)th stage. A first quarter-wave line 151F and a second quarter-wave line 151S are each formed of a microstrip line. Split impedances at the first split terminal 154 and the second split terminal 154 of the splitter-combiner circuit 150 constituting a j-th circuit stage 160 are higher than split impedances at the first split terminal 154 and the second split terminal 154 of the first-stage splitter-combiner circuit 150 and a combined impedance at the combining terminal 153 of the n-th stage splitter-combiner circuit 150.

Modified Example 1

TABLE 6

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) | LINE WIDTH L (μm) OF GROUND WIRING |
|---|---|---|---|---|
| FIRST STAGE | 50 | 15 | 25/50 | 90 |
| SECOND STAGE | 70.7 | 6 | 50/50 | 36 |
| THIRD STAGE | 54.7 | 12.5 | 50/30 | 75 |

As shown in Table 6, the splitter-combiner 101 of modified example 1 has a configuration in which a terminal impedance at the combining terminal of the third stage is slightly higher than a terminal impedance at the split terminal of the first stage. A terminal impedance at a terminal other than the split terminal of the first stage and the combining terminal of the third stage is set to be higher than the terminal impedances at the split terminal of the first stage and the combining terminal of the third stage. As a result, characteristic impedances of the quarter-wave lines of the first stage, the second stage, and the third stage are 50Ω, 70.7Ω, and 54.7Ω, respectively. The line widths W of the quarter-wave lines 151 are 15 μm, 6 μm, and 12.5 μm, respectively. As a result, ΣL, which is a sum of line widths L of the ground wirings, is 201 μm.

Since a sum of the line widths L of the ground wirings when the terminal impedance is 25Ω at all the terminals is 540 μm, the line width L of the ground wiring can be reduced in the splitter-combiner 101 of modified example 1. Therefore, a metal density in the splitter-combiner circuit can be reduced in the splitter-combiner 101 of modified example 1.

Modified Example 2

TABLE 7

| STAGE | CHARACTERISTIC IMPEDANCE ZO (Ω) | LINE WIDTH W (μm) OF QUARTER-WAVE LINE | SPLIT IMPEDANCE ZIN (Ω)/ COMBINED IMPEDANCE ZOUT (Ω) | LINE WIDTH L (μm) OF GROUND WIRING |
|---|---|---|---|---|
| FIRST STAGE | 50 | 15 | 25/50 | 90 |
| SECOND STAGE | 50 | 15 | 50/25 | 90 |
| THIRD STAGE | 38.7 | 25.3 | 25/30 | 152 |

As shown in Table 7, the splitter-combiner 101 of modified example 2 has a configuration in which a terminal impedance at the combining terminal of the third stage is slightly higher than a terminal impedance at the split terminal of the first stage. A terminal other than the split terminal of the first stage and the combining terminal of the third stage includes one terminal whose terminal impedance is higher than the terminal impedance of the split terminal of the first stage, and one terminal whose terminal impedance is lower than the terminal impedance of the combining terminal of the third stage. As a result, characteristic impedances of the quarter-wave lines of the first stage, the second stage, and the third stage are 50Ω, 50Ω, and 38.7Ω, respectively. The line widths W of the quarter-wave lines 151 are 15 μm, 15 μm, and 25.3 μm, respectively. As a result, ΣL, which is a sum of the line widths L of the ground wirings, is 332 μm.

Since a sum of the line widths L of the ground wirings when the terminal impedance is 25Ω at all the terminals is 540 μm, a sum of the line widths L of the ground wirings can be reduced in the splitter-combiner 101 of modified example 2. Therefore, a metal density in the splitter-combiner circuit can be reduced. Furthermore, since the line width of the final stage (third stage) splitter-combiner circuit is large, there is an advantage that power durability is excellent.

Although a specific form of embodiment has been described above and illustrated in the accompanying drawings in order to be more clearly understood, the above description is made by way of example and not as limiting the scope of the invention defined by the accompanying claims. While details of the embodiments have been described above, the invention is not limited to the above-described embodiments, and various modifications can be without departing from the spirit of the invention.

For example, the splitter-combiner may include a connection terminal (external connection terminal) for connecting the splitter-combiner circuit part 5 to an external circuit instead of including, for example, the combining circuit block 4.

In the splitter-combiner, the line width W of the quarter-wave line 151 (the signal line 501) of each stage may be set not to decrease from the first stage to the third stage at the least. Even with such a configuration, there is an effect that power durability of the splitter-combiner (particularly at a high stage) can be enhanced and reliability can be improved as in all the embodiments described above.

In the splitter-combiner, the microstrip line forming the quarter-wave line 151 may at least include the signal line 501 formed on a first surface 202*a* of a substrate 202 to form the quarter-wave line 151, and the ground wiring 503 formed on a second surface 202*b* of the substrate 202. That is, the microstrip line forming the quarter-wave line 151 in the splitter-combiner may not include the side ground wiring 502. Also, the quarter-wave line 151 is not limited to being formed of the microstrip line, and may be formed of, for example, a coplanar line.

The invention claimed is:

1. A splitter-combiner comprising:

a first quarter-wave line including a first end and a second end, the first end forming a first split terminal, the second end being located at an opposite side of the first end;

a second quarter-wave line including a third end and a fourth end, the second quarter-wave line being away from the first quarter-wave line, the third end forming a second split terminal, the fourth end being located at an opposite side of the third end;

an absorption resistance provided between the first end and the third end;

a combining terminal formed by connection of the second end and the fourth end; and a line bending circuit including a line parallel region and a line bending region, the line parallel region having the first quarter-wave line and the second quarter-wave line, the first quarter-wave line and the second quarter-wave line being adjacent and parallel to each other in the line parallel region, the line bending region having the first quarter-wave line and the second quarter-wave line, the first quarter-wave line and the second quarter-wave line being adjacent to each other and bent in the same direction as each other in the line bending region.

2. The splitter-combiner according to claim 1, wherein the first quarter-wave line includes a bent portion, a part of the first quarter-wave line is bent at the bent portion, and the bent portion includes a portion not parallel to the second quarter-wave line.

3. The splitter-combiner according to claim 1, wherein the first quarter-wave line includes a first bent portion located between the first end and the second end, the first quarter-wave line is bent at 180 degrees at the first bent portion, a wave-line direction from the first end to the first bent portion and a wave-line direction from the first bent portion to the second end are opposite to each other, the second quarter-wave line includes a second bent portion located between the third end and the fourth end, the second quarter-wave line is bent at 180 degrees at the second bent portion, and a wave-line direction from the third end to the second bent portion and a wave-line direction from the second bent portion to the fourth end are opposite to each other.

4. The splitter-combiner according to claim 1, further comprising:

a first circuit block including a first connection terminal connected to the first end of the first quarter-wave line; and a second circuit block including a second connection terminal connected to the third end of the second quarter-wave line, wherein the first circuit block and the second circuit block are aligned in an array direction in which the first end and the third end are aligned, and the first connection terminal and the second connection terminal face each other in the array direction of the first end and the third end.

5. The splitter-combiner according to claim 1, further comprising:

a splitter-combiner circuit part including S circuit stages (S is an integer greater than or equal to two and less than or equal to n) and $(2^n-1)$ splitter-combiner circuits (n is an integer greater than or equal to two), the $(2^n-1)$ splitter-combiner circuits being connected stepwise in the S circuit stages; and $2^n$ circuit blocks, wherein each of the $(2^n-1)$ splitter-combiner circuits includes the first split terminal, the second split terminal, the first quarter-wave line, the second quarter-wave line, the absorption resistance, and the combining terminal, a first circuit stage includes $2^n$ split terminals in total including the first split terminal and the second split terminal and includes $2^n/2$ splitter-combiner circuits, each of the first split terminal and the second split terminal of one splitter-combiner circuit forming S-th circuit stage is connected to the combining terminal of one splitter-combiner circuit forming (S−1)th circuit stage, at least one of the ($2^n$−1) splitter-combiner circuits is the line bending circuit, the $2^n$ circuit blocks are connected to the $2^n$ split terminals of the first circuit stage in one-to-one correspondence, the $2^n$ circuit blocks forms a first circuit block group and a second circuit block group, $2^n$/2 circuit blocks are aligned in line in a first direction in the first circuit block group, $2^n$/2 circuit blocks are aligned in line in the first direction in the second circuit block group, the first circuit block group is spaced apart from the second circuit block group at a distance in a second direction orthogonal to the first direction, and the splitter-combiner circuit part is disposed between the first circuit block group and the second circuit block group.

6. The splitter-combiner according to claim 1, further comprising:

a splitter-combiner circuit part including S circuit stages (S is an integer greater than or equal to two and less than or equal to n) and ($2^n$−1) splitter-combiner circuits (n is an integer greater than or equal to two), the ($2^n$−1) splitter-combiner circuits being connected stepwise in the S circuit stages, wherein each of the ($2^n$−1) splitter-combiner circuits includes the first split terminal, the second split terminal, the first quarter-wave line, the second quarter-wave line, the absorption resistance, and the combining terminal, a first circuit stage includes $2^n$ split terminals in total including the first split terminal and the second split terminal and includes $2^n$/2 splitter-combiner circuits, each of the first split terminal and the second split terminal of one splitter-combiner circuit forming S-th circuit stage is connected to the combining terminal of one splitter-combiner circuit forming (S−1)th circuit stage, the splitter-combiner circuit constituting at least the first circuit stage is the line bending circuit, and the first quarter-wave line and the second quarter-wave line of the splitter-combiner circuit which constitute at least one circuit stage selected from a plurality of stages from a second circuit stage to an (n−1)th circuit stage extend on opposite sides to each other from the first split terminal and the second split terminal to form a loop shape.

7. The splitter-combiner according to claim 1, further comprising:

a splitter-combiner circuit part including S circuit stages (S is an integer greater than or equal to two and less than or equal to n) and ($2^n$−1) splitter-combiner circuits (n is an integer greater than or equal to two), the ($2^n$−1) splitter-combiner circuits being connected stepwise in the S circuit stages, wherein each of the ($2^n$−1) splitter-combiner circuits includes the first split terminal, the second split terminal, the first quarter-wave line, the second quarter-wave line, the absorption resistance, and the combining terminal, a first circuit stage includes $2^n$ split terminals in total including the first split terminal and the second split terminal and includes $2^n$/2 splitter-combiner circuits, each of the first split terminal and the second split terminal of one splitter-combiner circuit forming S-th circuit stage is connected to the combining terminal of one splitter-combiner circuit forming (S−1)th circuit stage, at least one of the ($2^n$−1) splitter-combiner circuits is the line bending circuit, and a length of a connection line connecting the first split terminal and the combining terminal is different from a length of a connection line connecting the second split terminal and the combining terminal in connection between each of the first split terminal and the second split terminal of one splitter-combiner circuit constituting the S-th circuit stage and the combining terminal of one splitter-combiner circuit constituting the (S−1)th circuit stage.

8. A cascade connection circuit comprising:

($2^n$−1) splitter-combiner circuits, each splitter-combiner circuit forming the splitter-combiner according to claim 1; and n circuit stages (n is an integer greater than or equal to two) in which the ($2^n$−1) splitter-combiner circuits are connected stepwise, wherein a combined impedance at the combining terminal of the splitter-combiner circuit constituting an n-th circuit stage is higher than a split impedance at the split terminal of the splitter-combiner circuit constituting a first circuit stage.

9. The cascade connection circuit according to claim 8, wherein, in S circuit stages (S is an integer greater than or equal to two and less than or equal to n) included in the n circuit stages, a first circuit stage includes $2^n$ split terminals in total including the first split terminals and the second split terminals and is constituted by $2^n$/2 splitter-combiner circuits, the first split terminal and the second split terminal of the splitter-combiner circuit constituting an S-th circuit stage are connected to the combining terminals of two splitter-combiner circuits constituting an (S−1)th circuit stage, a combined impedance at the combining terminal of the splitter-combiner circuit constituting the n-th circuit stage is higher than a split impedance at the split terminal of the splitter-combiner circuit constituting the first circuit stage, the first quarter-wave line and the second quarter-wave line are each formed of a microstrip line with a side shield, and in the splitter-combiner circuit constituting at least one set of two continuous circuit stages, a line width of the first quarter-wave line of the splitter-combiner circuit constituting one of the stages and a line width of the first quarter-wave line of the splitter-combiner circuit constituting the other of the stages are equal to each other, and a line width of the second quarter-wave line of the splitter-combiner circuit constituting one of the stages and a line width of the second quarter-wave line of the splitter-combiner circuit constituting the other of the stages are equal to each other.

10. The cascade connection circuit according to claim 8, wherein, in S circuit stages (S is an integer greater than or equal to two and less than or equal to n) and i circuit stages (i is an integer greater than or equal to two and less than or equal to (n−1)) included in the n circuit stages, a first circuit stage includes $2^n$ split terminals in total including the first split terminals and the second split terminals and is constituted by $2^n$/2 splitter-combiner circuits, the first split terminal and the second split terminal of the splitter-combiner circuit constituting an S-th circuit stage are connected to the combining terminals of two splitter-combiner circuits constituting an (S−1)th circuit stage, line widths of a plurality of first quarter-wave lines of a plurality of splitter-combiner circuits constituting circuit stages from an i-th stage to the n-th stage are equal to each other, line widths of a plurality of second quarter-wave lines of the plurality of splitter-combiner circuits constituting circuit stages from the i-th stage to the n-th stage are equal to each other, the first quarter-wave line and the second quarter-wave line of each of the plurality of splitter-combiner circuits constituting circuit stages from the i-th stage to the n-th stage have a first line width, a maximum line width among a plurality of line widths of the first quarter-wave line and the second quarter-wave line of the splitter-combiner circuit in the plurality of splitter-combiner circuits constituting circuit stages from the first stage to an (i−1)th stage is a second line width, and the first line width is larger than the second line width.

11. The cascade connection circuit according to claim 8, wherein, in S circuit stages (S is an integer greater than or equal to two and less than or equal to n) included in the n circuit stages, a first circuit stage includes $2^n$ split terminals in total including the first split terminals and the second split terminals and is constituted by $2^n/2$ splitter-combiner circuits, the first split terminal and the second split terminal of the splitter-combiner circuit constituting an S-th circuit stage are connected to the combining terminals of two splitter-combiner circuits constituting an (S−1)th circuit stage, and, in two or more circuit stages selected from a plurality of stages from the first circuit stage to the n-th circuit stage and aligned to be continuous, a line width of the first quarter-wave line and a line width of the second quarter-wave line of the splitter-combiner circuit constituting the circuit stage increase sequentially as the number of stages of the circuit stages increases.

12. The cascade connection circuit according to claim 8, wherein, in S circuit stages (S is an integer greater than or equal to two and less than or equal to n) and j circuit stages (j is an integer greater than or equal to two and less than or equal to n) included in the n circuit stages, a first circuit stage includes $2^n$ split terminals in total including the first split terminals and the second split terminals and is constituted by $2^n/2$ splitter-combiner circuits, the first split terminal and the second split terminal of the splitter-combiner circuit constituting an S-th circuit stage are connected to the combining terminals of two splitter-combiner circuits constituting an (S−1)th circuit stage, the first quarter-wave line and the second quarter-wave line are each formed of a microstrip line, and split impedances at the first split terminal and the second split terminal of at least one splitter-combiner circuit constituting a j-th circuit stage are higher than split impedances at the first split terminal and the second split terminal of the first-stage and a combined impedance at the combining terminal of the splitter-combiner circuit of an n-th stage.

13. A splitter-combiner comprising:

a first quarter-wave line including a first end and a second end, the first end forming a first split terminal, the second end being located at an opposite side of the first end;

a second quarter-wave line including a third end and a fourth end, the second quarter-wave line being away from the first quarter-wave line, the third end forming a second split terminal, the fourth end being located at an opposite side of the third end;

an absorption resistance provided between the first end and the third end; and a combining terminal formed by connection of the second end and the fourth end; wherein the first quarter-wave line includes a first bent portion located between the first end and the second end, the first quarter-wave line is bent at 180 degrees at the first bent portion, a wave-line direction from the first end to the first bent portion and a wave-line direction from the first bent portion to the second end are opposite to each other, the second quarter-wave line includes a second bent portion located between the third end and the fourth end, the second quarter-wave line is bent at 180 degrees at the second bent portion, and a wave-line direction from the third end to the second bent portion and a wave-line direction from the second bent portion to the fourth end are opposite to each other.

* * * * *